(12) United States Patent
Lee et al.

(10) Patent No.: US 7,453,533 B2
(45) Date of Patent: Nov. 18, 2008

(54) JIG FOR DELIVERING LIQUID CRYSTAL DISPLAY PLATE AND METHOD OF FABRICATING LIQUID CRYSTAL DISPLAY

(75) Inventors: Woo-jae Lee, Yongin-si (KR); Mun-pyo Hong, Seongnam-si (KR)

(73) Assignee: Samsung Electronics Co., Ltd. (KR)

( * ) Notice: Subject to any disclaimer, the term of this patent is extended or adjusted under 35 U.S.C. 154(b) by 614 days.

(21) Appl. No.: 11/117,826

(22) Filed: Apr. 29, 2005

(65) Prior Publication Data

US 2006/0055842 A1 Mar. 16, 2006

(30) Foreign Application Priority Data

Sep. 11, 2004 (KR) .................. 10-2004-0072811

(51) Int. Cl.
*G02F 1/1333* (2006.01)
*G06F 1/16* (2006.01)
(52) U.S. Cl. .................. 349/58; 349/122; 361/681
(58) Field of Classification Search .......... 349/58, 349/187, 122; 361/681
See application file for complete search history.

(56) References Cited

U.S. PATENT DOCUMENTS

| 5,100,491 A * | 3/1992 | Ijiri et al. ............. 156/220 |
| 6,501,495 B1 * | 12/2002 | Ichikawa et al. ........ 347/171 |
| 6,825,910 B2 * | 11/2004 | Aoki et al. ............. 349/190 |
| 2005/0206796 A1 * | 9/2005 | Okabe ..................... 349/43 |

FOREIGN PATENT DOCUMENTS

| JP | 2000-252342 | * 9/2000 |
| JP | 2000-338454 | 12/2000 |
| KR | 10-2004-0006894 | 1/2004 |

* cited by examiner

*Primary Examiner*—Mike Qi
(74) *Attorney, Agent, or Firm*—Cantor Colburn LLP

(57) ABSTRACT

A jig for delivering a plastic plate used to make a lighter and thinner liquid crystal display plate and a method of fabricating a liquid crystal display are provided. The jig includes a support substrate, an adhesive layer disposed at the support substrate, and an adhesive agent layer disposed at the adhesive layer and surrounded by the adhesive layer.

22 Claims, 18 Drawing Sheets

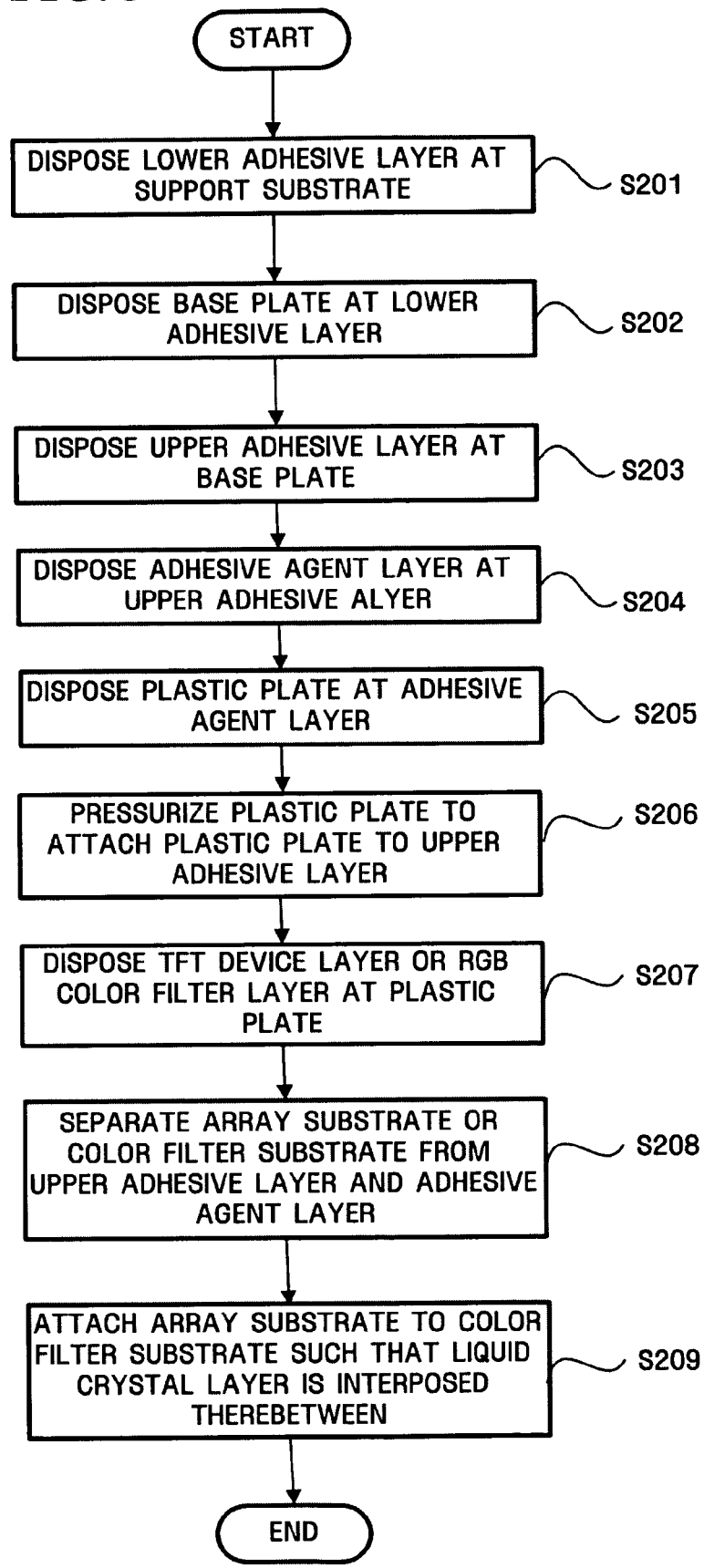

JIG FOR DELIVERING LIQUID CRYSTAL DISPLAY PLATE AND METHOD OF FABRICATING LIQUID CRYSTAL DISPLAY

BACKGROUND OF THE INVENTION

1. Field of the Invention

The present invention relates to a jig for delivering a liquid crystal display plate and a method of fabricating a liquid crystal display, and more particularly, to a jig for delivering a plastic plate used to make a lighter and thinner liquid crystal display plate and a method of fabricating a liquid crystal display.

2. Description of the Related Art

It is becoming increasingly desirable to fabricate light and thin liquid crystal displays for electronic display devices. This is particularly true with respect to portable electronic display devices, such as portable information terminals and portable phones.

Approaches to fabricating light and thin liquid crystal displays include reducing a density or thickness of a glass plate which forms a component of a liquid crystal display. Silicon dioxide ($SiO_2$) is a major component of glass, which substantially determines physical properties of glass. Due to technological restrictions, it is difficult to alter certain physical properties of glass. For example, it is difficult to reduce the density of glass beyond a certain point. Additionally, when the thickness of the glass plate is reduced, the strength of the glass plate is degraded. Accordingly, equipment in fabrication lines must be changed to decrease external forces placed on the glass plate. However, the thickness of the glass plate cannot be reduced below 0.7 mm in mass production. Thus, fabrication of a light and thin liquid crystal display is difficult since large glass plates (having a size of at least 300×300 mm) with a thickness of 0.5 or 0.3 mm are desired for use.

As an alternative to thickness reduction, a liquid crystal display using a plastic plate instead of the glass plate has been developed. A method of delivering a plastic plate in a sheet form and a method of continuously delivering a plastic plate in a roll form have been suggested as approaches to fabricating the liquid crystal display using the plastic plate.

However, the plastic plate has low rigidity, low heat distortion temperature, and low surface hardness and is easily broken or deformed (e.g., expanded or contacted) during a heating process. Thus, it is often more difficult to fabricate the liquid crystal display using the plastic plate than to fabricate the liquid crystal display using the glass plate.

To overcome these problems, a method of delivering a plastic plate fixed to a frame to fabricate a liquid crystal display has been proposed. In addition, a method of pressurizing a peripheral portion of a plastic plate onto a support substrate and cutting the pressurized portion and a method of placing a polymer resin of a plastic plate on a release film have been suggested.

However, in the method of delivering the plastic plate fixed to the frame, the plastic plate warps within the frame making it difficult to achieve surface flatness of the plastic plate. To achieve surface flatness of the plastic plate within the frame, printing machines or exposure systems need, for example, a special stage shape, which leads to an increase in fabrication cost. In addition, the method is not compatible with the glass plate.

Meanwhile, the method of placing the polymer resin of the plastic plate on the release film has the following problems. First, efficient delivery cannot be accomplished due to low rigidity of a support substrate, i.e., the release film. Second, available fabrication processes, equipment and conditions are very restricted. Third, since adherence between the release film and the polymer resin is low, it is difficult to accomplish reliable delivery. Moreover, when heat treatment is performed, bubbles or partial separation may occur at an interface between the release film and the polymer resin, which prohibits subsequent processes from being performed.

SUMMARY OF THE INVENTION

The present invention provides a jig for delivering a thin liquid crystal display plate. The present invention also provides a method of fabricating a liquid crystal display plate using the jig for delivering the thin liquid crystal display plate. The present invention also provides a method of fabricating a liquid crystal display using the liquid crystal display plate.

According to an aspect of the present invention, there is provided a jig for delivering a liquid crystal display plate, including a support substrate, an adhesive layer disposed at the support substrate, and an adhesive agent layer disposed at the adhesive layer and surrounded by the adhesive layer.

According to another aspect of the present invention, there is provided a method of fabricating a liquid crystal display, including disposing an adhesive layer at a support substrate, disposing an adhesive agent layer at the adhesive layer, disposing a plastic plate at the adhesive agent layer, and attaching the plastic plate to a peripheral portion of the adhesive layer surrounding the adhesive agent layer by pressurizing the plastic plate.

This application claims priority from Korean Patent Application No. 10-2004-0072811 filed on Sep. 11, 2004 in the Korean Intellectual Property Office, the disclosure of which is incorporated herein by reference in its entirety.

BRIEF DESCRIPTION OF THE DRAWINGS

The above and other features and advantages of the present invention will become more apparent by describing in detail preferred embodiments thereof with reference to the attached drawings in which:

FIG. 3 is a flowchart of a method of fabricating a liquid crystal display according to an exemplary embodiment of the present invention;

DETAILED DESCRIPTION OF THE INVENTION

Figure 1:
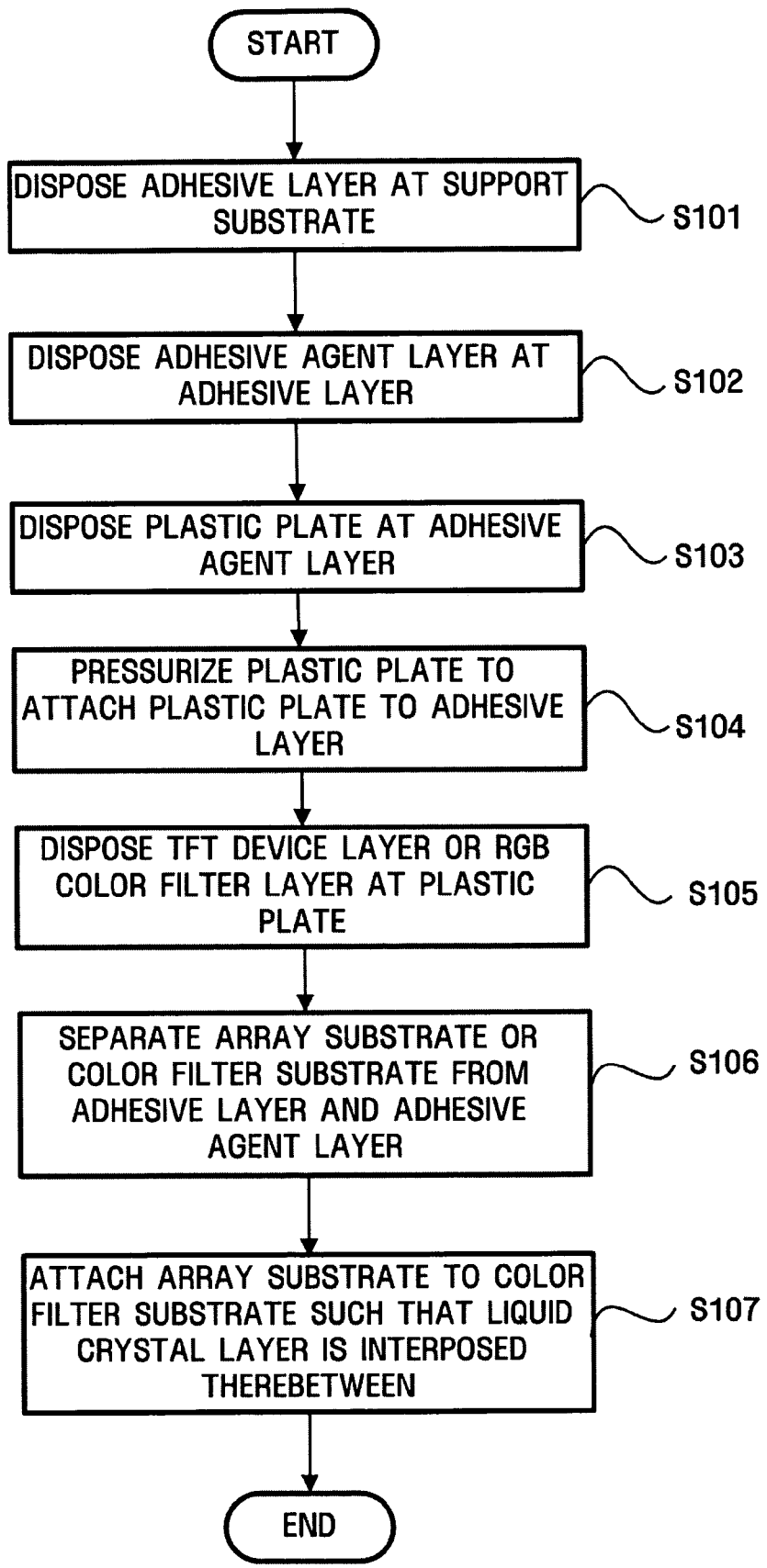
FIG. 1 is a flowchart of a method of fabricating a liquid crystal display according to an exemplary embodiment of the present invention.

Advantages and features of the present invention and methods of accomplishing the same may be understood more readily by reference to the following detailed description of preferred embodiments and the accompanying drawings. The present invention may, however, be embodied in many different forms and should not be construed as being limited to the embodiments set forth herein. Rather, these embodiments are provided so that this disclosure will be thorough and complete and will fully convey the concept of the invention to those skilled in the art, and the present invention will only be defined by the appended claims. Like reference numerals refer to like elements throughout the specification. Hereinafter, preferred embodiments of the present invention will be described in detail with reference to the attached drawings.

FIG. 1 is a flowchart of a method of fabricating a liquid crystal display according to an exemplary embodiment of the present invention, and FIGS. 2A through 2K include sectional views and a plane view of stages in the method of FIG. 1.

Figure 2A:
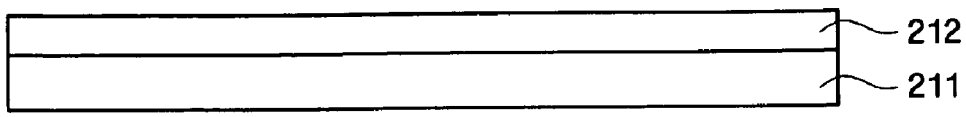
FIGS. 2A through 2K include sectional views and a plane view of stages in the method of fabricating the liquid crystal display of FIG. 1.

Referring to FIGS. 1 and 2A, in operation S101, an adhesive layer 212 is disposed at a support substrate 211. The support substrate 211 may be a glass plate or a transparent resin plate. The adhesive layer 212 has a strong adhesive strength and is formed using a material having adhesive strength which does not decrease due to a heating or cooling process. For example, the adhesive layer 212 may be formed using a silicon adhesion such as a silicon PSA tape or a high heat-resistant silicon adhesion. The adhesive layer 212 is disposed at the support substrate 211 using a typical spin coating or lamination method. A thickness of the adhesive layer 212 may be from about 5 µm to about 15 µm but is not restricted thereto.

Figure 2B:
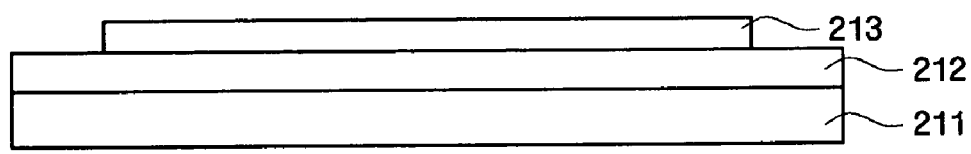
Figure 2C:
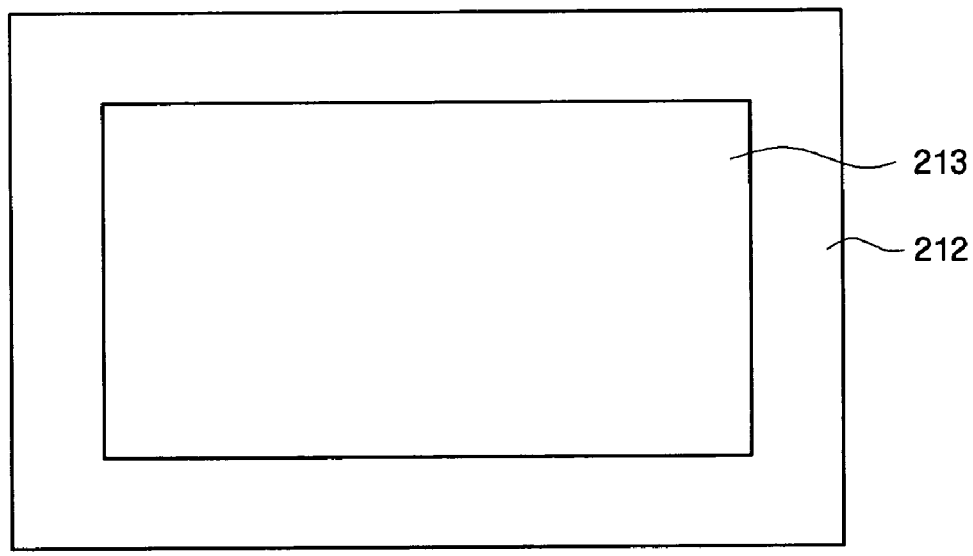

Referring now to FIGS. 1, 2B and 2C, in operation S102, an adhesive agent layer 213 is disposed at the adhesive layer 212. The adhesive agent layer 213 is formed to have a smaller size than a size of the adhesive layer 212 to allow a plastic plate to be attached to the adhesive layer 212. The adhesive agent layer 213 is disposed at the adhesive layer 212 such that edge portions of the adhesive agent layer 213 are spaced apart from corresponding edge portions of the adhesive layer 212.

The adhesive agent layer 213 fixes an object at a room temperature like a typical adhesive agent but is formed using a material that is easily separated from the object by an ultraviolet process, a heating process, or a cooling process. If an adhesive agent separated from the object by an ultraviolet process is used, the plastic plate may be detached during exposure of an array substrate or color filter substrate to ultraviolet light and may be broken by a long exposure. If an adhesive agent separated from the object by a heating process is used, stress may be applied to the plastic plate due to thermal expansion during the heating process and crack the plastic plate. Accordingly, the adhesive agent layer 213 used to fabricate the liquid crystal display according to this embodiment of the present invention is formed using a thermosensitive adhesive agent that is easily separated from the object by a cooling process. For example, the adhesive agent layer 213 may be formed using an acrylic adhesive agent such as an acrylic resin based thermosensitive adhesive tape that is activated at a low temperature. The adhesive agent layer 213 may be disposed at the adhesive layer 212 using a typical spin coating or lamination method. A thickness of the adhesive agent layer 213 may be from about 5 µm to about 15 µm but is not restricted thereto.

Figure 2D:
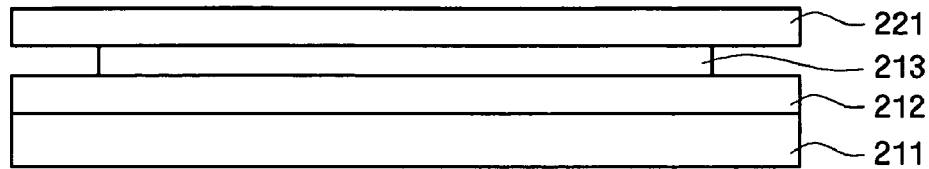

Referring now to FIGS. 1 and 2D, in operation S103, a plastic plate 221 is disposed at the adhesive agent layer 213. The plastic plate 221 may be formed using a polycarbonate plate, a polyether sulfone plate, or a polyarylate plate, but is not restricted thereto. The plastic plate 221 has less density than a glass plate having a same thickness as the plastic plate 221, and therefore, a lighter liquid crystal display can be fabricated. Additionally, the plastic plate 221 may have a same resistance to impact as the glass plate, but be thinner than the glass plate, thereby enabling a thinner liquid crystal display to be fabricated. The thickness of the plastic plate 221 may be from about 25 µm to about 400 µm but is not restricted thereto. In addition, the plastic plate 221 should be larger than the adhesive agent layer 213 so that the plastic plate 221 can be attached to the adhesive layer 212 located below the adhesive agent layer 213.

Figure 2E:
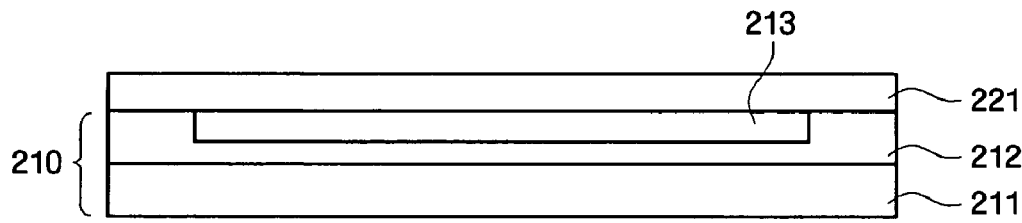

Referring now to FIGS. 1 and 2E, in operation S104, the plastic plate 221 is pressurized to attach the plastic plate 221 to the adhesive layer 212. Pressure is applied to a structure on which the support substrate 211, the adhesive layer 212, the adhesive agent layer 213, and the plastic plate 221 are stacked sequentially. A roller or laminating machine may be used to press the structure, but the present invention is not restricted thereto.

When the plastic plate 221 is pressurized, a space between the plastic plate 221 and the adhesive layer 212 is eliminated and a portion of the plastic plate 221 that extends beyond corresponding edges of the adhesive agent layer 213 is attached to the adhesive layer 212. As a result, as shown in FIG. 2E, the plastic plate 221 is attached onto a jig 210 for delivering a liquid crystal display plate. The jig 210 includes the support substrate 211, the adhesive layer 212, and the adhesive agent layer 213.

As described above, when the plastic plate 221 is disposed at the jig 210 such that the plastic plate 221 is directly attached to the adhesive layer 212, the plastic plate 221 remains fixed during a heating or cooling process. The plastic plate 221 remains fixed since the adhesive strength of the adhesive layer 212 is not affected by the heating or cooling process, even if gas is generated from a solvent contained in the adhesive agent layer 213. As a result, product yield increases.

Figure 2F:
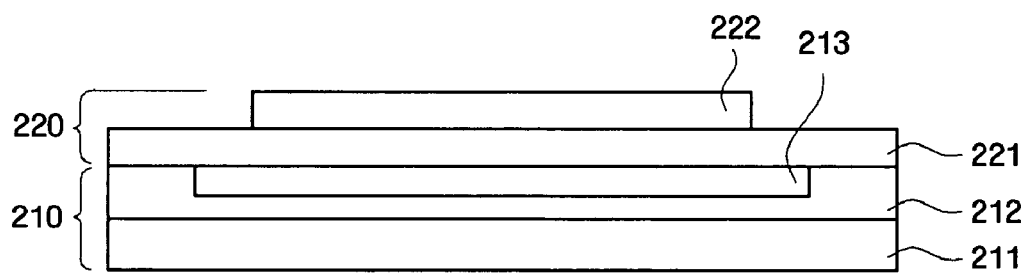
Figure 2G:
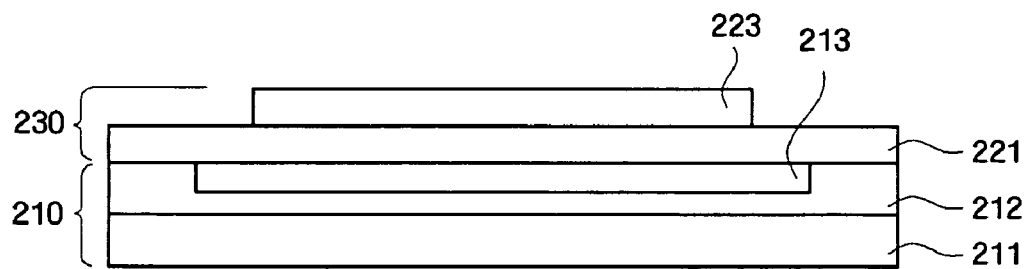

Referring now to FIGS. 1, 2F and 2G, in operation S105, a thin film transistor (TFT) device layer 222 or an RGB color filter layer 223 is disposed at the plastic plate. The jig 210 to which the plastic plate 221 is attached is loaded into a chamber. Although not clearly shown, a gate bus line and a TFT gate electrode are sequentially disposed at the plastic plate 221, and a gate insulating film is formed. Subsequently, a source electrode, a drain electrode and a data bus line are formed, thereby forming a TFT. Next, an indium tin oxide (ITO) pixel electrode is deposited and then an over coating layer is formed, thereby forming the TFT device layer 222. The TFT device layer 222 and the plastic plate 221 constitute an array substrate 220 as shown in FIG. 2F.

While the TFT device layer 222 is formed, temperature in the chamber goes up to a range of about 140° C. to about 150° C. However, heat applied to the plastic plate 221 is dispersed by the support substrate 211 included in the jig 210. In addition, since the plastic plate 221 is firmly fixed to the support substrate 211 by an adhesive agent, the plastic plate 221 is prevented from deforming during fabrication processes.

Similarly, referring to FIG. 2G, a color filter substrate 230 including the plastic plate 221 and the RGB color filter layer 223 disposed at the plastic plate 221 may be formed using a same process as that used to form the array substrate 220 as described referring to FIG. 2F.

Referring now to FIGS. 1, 2H, 2I and 2J, in operation S106, the array substrate 220 or the color filter substrate 230 is separated from the adhesive layer 212 and the adhesive agent layer 213. A method of separating the array substrate 220 or the color filter substrate 230 from the adhesive layer 212 and the adhesive agent layer 213 will be described below.

Figure 2H:
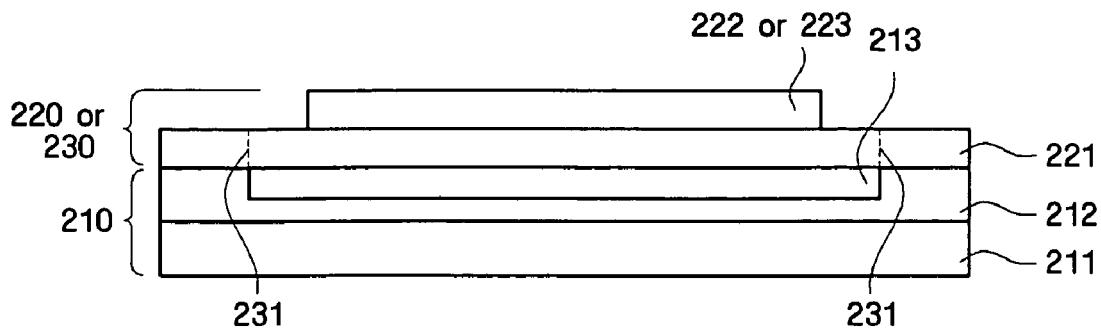

Referring to FIG. 2H, a half cutting operation is performed on the array substrate 220 or the color filter substrate 230 to form a separation line 231 to a surface of the adhesive agent layer 213 in the jig 210. The separation line 231 extends through the plastic plate 221 in a direction substantially perpendicular to a face of the plastic plate 221. Additionally, the separation line 231 may be formed to correspond to edge portions of the adhesive agent layer 213. Through the half cutting operation, the array substrate 220 or the color filter substrate 230 can be easily separated from the jig 210.

Figure 2I:
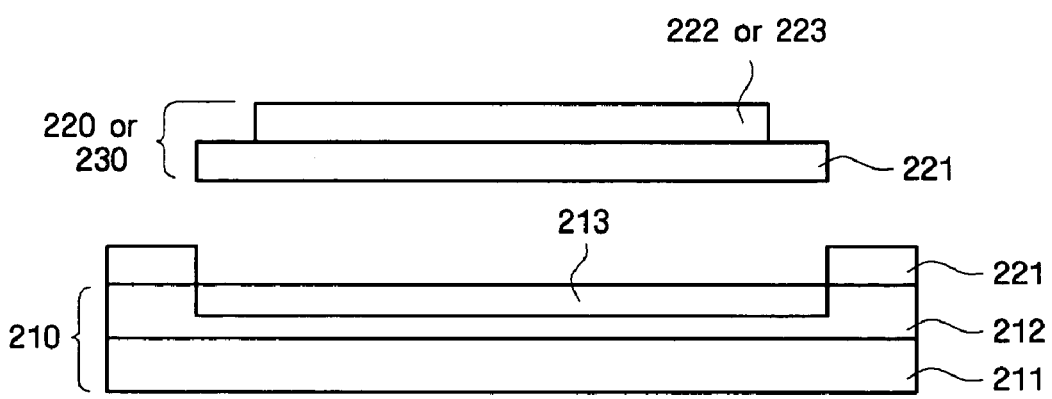

Referring to FIG. 2I, conditions required for separation of the array substrate 220 or the color filter substrate 230 from the jig 210 differ according to a type of adhesive agent forming the adhesive agent layer 213. For example, the adhesive agent forming the adhesive agent layer 213 may release an object when the adhesive agent layer 213 is heated or exposed to ultraviolet (UV) radiation. The adhesive agent forming the adhesive agent layer 213 used to fabricate the liquid crystal display according to this embodiment releases an object at a temperature in a range of about 0° C. to about 5° C. Accordingly, the array substrate 220 or the color filter substrate 230 may be separated from the adhesive agent layer 213 of the jig 210 following about 10 minutes at about 0° C. and about 24 hours at about 5° C.

Figure 2J:
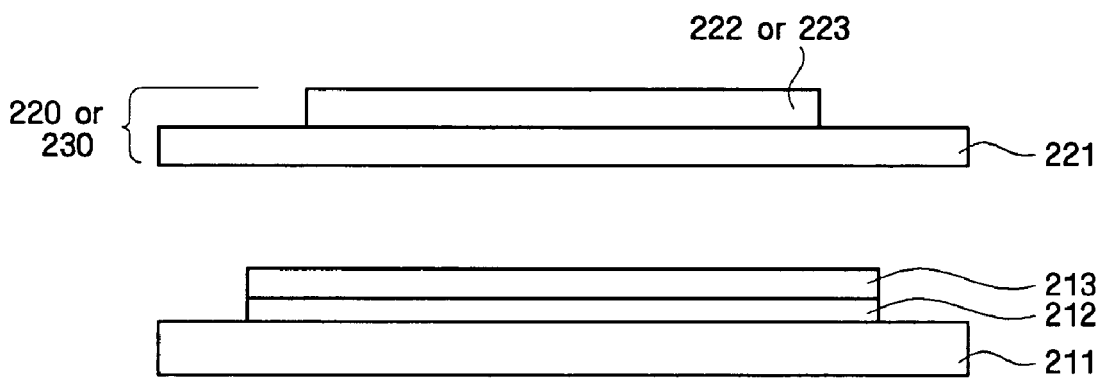

Another method of separating the array substrate 220 or the color filter substrate 230 from the adhesive layer 212 and the adhesive agent layer 213 is illustrated in FIG. 2J. A portion of the adhesive layer 212 not disposed between the adhesive agent layer 213 and the support substrate 211 is dissolved using an organic solvent such as tetrahydrofuran or chloroform, and then the adhesive agent layer 213 is cooled down to a temperature in a range of about 0° C. to about 5° C. Separating the array substrate 220 or the color filter substrate 230 from the jig 210 may be performed after attaching the array substrate 220 to the color filter substrate 230.

In operation S107, the array substrate 220 and the color filter substrate 230 are attached to each other such that a liquid crystal layer is interposed therebetween.

Figure 2K:
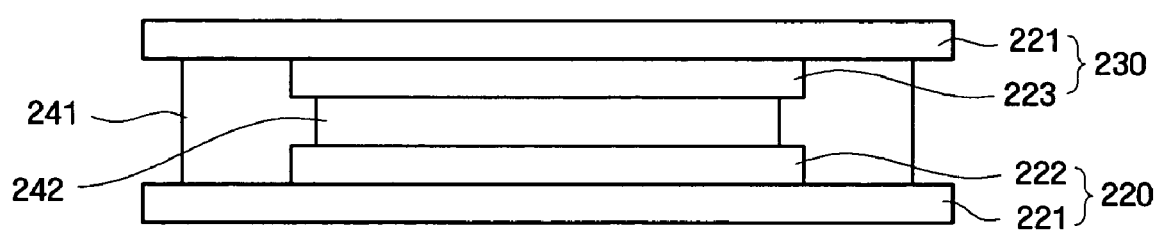

Referring to FIG. 2K, spacers are sprinkled on the color filter substrate 230 and a seal line 241 is disposed at the array substrate 220. Thereafter, the array substrate 220 and the color filter substrate 230 are attached, and then a liquid crystal 242 is injected into an attached structure, thereby completing a panel. Alternatively, the liquid crystal 242 may injected into the color filter substrate 230 having spacers sprinkled thereon, and then the array substrate 220 having the seal line 241 may be attached to the color filter substrate 230, thereby completing the panel.

FIG. 3 is a flowchart of a method of fabricating a liquid crystal display according to an exemplary embodiment of the present invention. FIGS. 4A through 4L include sectional views and a plane view of stages in the method of fabricating the liquid crystal display.

Figure 4A:
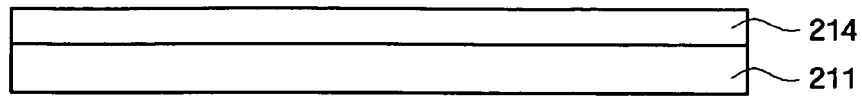
FIGS. 4A through 4L include sectional views and a plane view of stages in the method of fabricating the liquid crystal display of FIG. 3.

Referring to FIGS. 3 and 4A, in operation S201, a lower adhesive layer 214 is disposed at a support substrate 211. The support substrate 211 may be a glass plate or a transparent resin plate. The lower adhesive layer 214 has a strong adhesive strength and is formed using a material having adhesive strength which does not decrease due to a heating or cooling process. For example, the lower adhesive layer 214 may be formed using a silicon adhesion such as a silicon PSA tape or a high heat-resistant silicon adhesion. The lower adhesive layer 214 is disposed at the support substrate 211 using a typical spin coating or lamination method. The thickness of the lower adhesive layer 214 may be from about 5 μm to about 15 μm but is not restricted thereto.

Figure 4B:
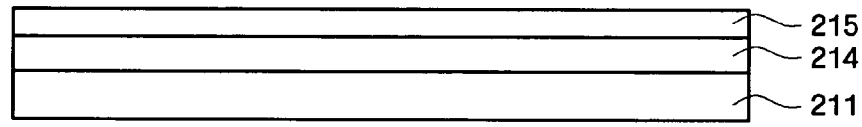

Referring now to FIGS. 3 and 4B, in operation S202, a base plate 215 is disposed at the lower adhesive layer 214. The base plate 215 may be formed using a polycarbonate plate, a polyether sulfone plate, or a polyarylate plate but is not restricted thereto. The base plate 215 supports a plastic plate during an array process in which a TFT device layer is disposed at the plastic plate. In addition, the base plate 215 functions as a protective substrate preventing the temperature of the plastic plate from increasing by dispersing heat generated during the array process. The base plate 215 may have a thickness of about 10 μm to about 100 μm but is not restricted thereto.

Figure 4C:
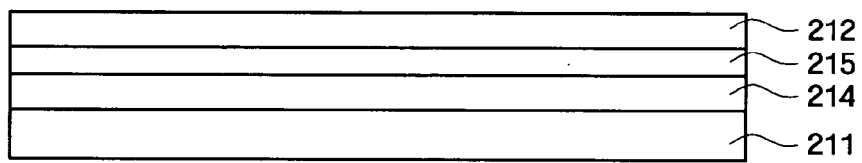

Referring now to FIGS. 3 and 4C, in operation S203, an upper adhesive layer 212 is disposed at the base plate 215. The upper adhesive layer 212 has a strong adhesive strength like the lower adhesive layer 214 and is formed using a material having adhesive strength which does not decrease due to a heating or cooling process. For example, the upper adhesive layer 212 may be formed using a silicon adhesion such as the silicon PSA tape or the high heat-resistant silicon adhesion. The upper adhesive layer 212 is disposed at the support substrate 211 using a typical spin coating or lamination method. The thickness of the upper adhesive layer 212 may be about 5 μm to about 15 μm but is not restricted thereto.

Figure 4D:
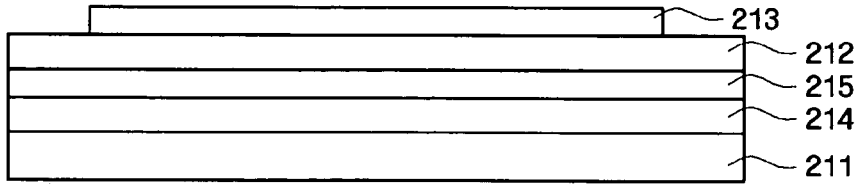
Figure 4E:
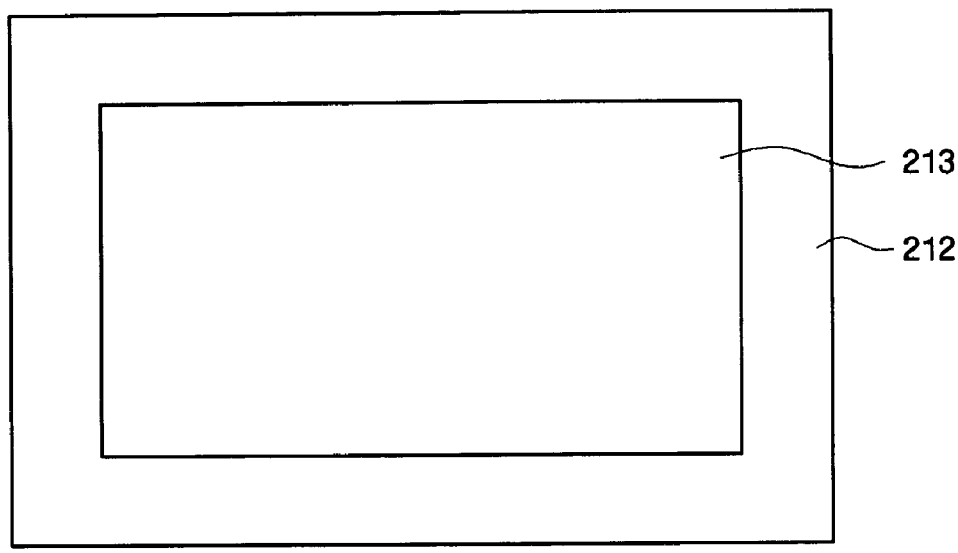

Referring now to FIGS. 3, 4D and 4E, in operation S204, an adhesive agent layer 213 is disposed at the upper adhesive layer 212. The adhesive agent layer 213 is formed to have a smaller size than a size of the upper adhesive layer 212 to allow a plastic plate to be attached to the upper adhesive layer 212.

The adhesive agent layer 213 fixes an object at a room temperature like a typical adhesive agent but is formed using a material that is easily separated from the object by an ultraviolet process, a heating process, or a cooling process. If an adhesive agent separated from the object by an ultraviolet process is used, the plastic plate may be detached during exposure of an array substrate or color filter substrate to ultraviolet light and may be broken by a long exposure. If an adhesive agent separated from the object by a heating process is used, stress may be applied to the plastic plate due to thermal expansion during the heating process and crack the plastic plate. Accordingly, the adhesive agent layer 213 used to fabricate the liquid crystal display according to this embodiment of the present invention may be formed using a thermosensitive adhesive agent that is easily separated from the object by a cooling process. For example, the adhesive agent layer 213 may be formed using an acrylic adhesive agent such as an acrylic resin based thermosensitive adhesive tape that is activated at a low temperature. The adhesive agent layer 213 may be disposed at the upper adhesive layer 212 using a typical spin coating or lamination method. The thickness of the adhesive agent layer 213 may be from about 5 μm to about 15 μm but is not restricted thereto.

Figure 4F:
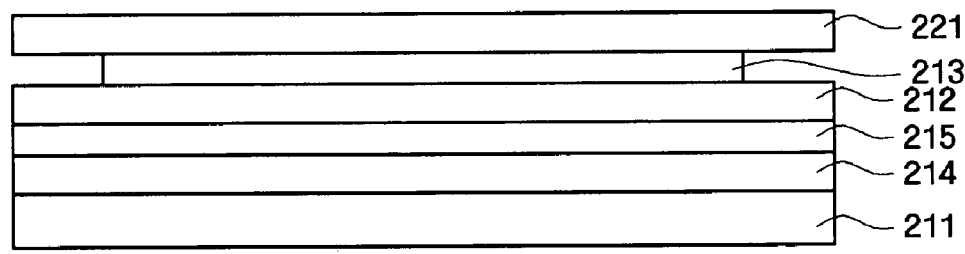

Referring now to FIGS. 3 and 4F, in operation S205, a plastic plate 221 is disposed at the adhesive agent layer 213. The plastic plate 221 may be formed using a polycarbonate plate, a polyether sulfone plate, or a polyarylate plate but is not restricted thereto. The plastic plate 221 has less density than a glass plate having a same thickness as the plastic plate 221, and therefore, a lighter liquid crystal display can be fabricated. Additionally, the plastic plate 221 may have a same resistance to impact as the glass plate, but be thinner than the glass plate, thereby enabling a thinner liquid crystal display to be fabricated. The thickness of the plastic plate 221 may be from about 25 μm to about 400 μm but is not restricted thereto. In addition, the plastic plate 221 should be larger than the adhesive agent layer 213 so that the plastic plate 221 can be attached to the upper adhesive layer 212 located below the adhesive agent layer 213.

Figure 4G:
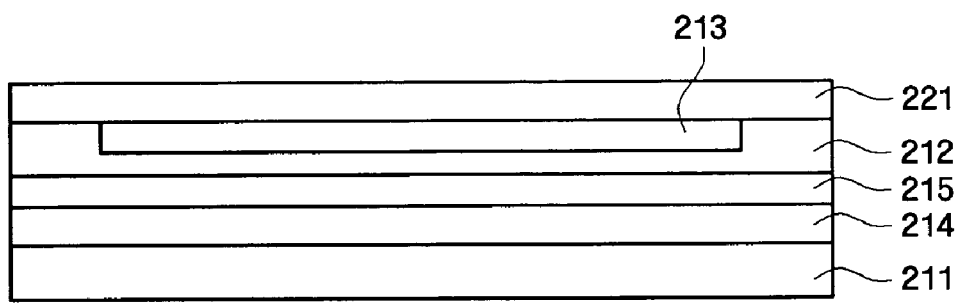

Referring now to FIGS. 3 and 4G, in operation S206, the plastic plate 221 is pressurized to attach the plastic plate 221 to the upper adhesive layer 212. Pressure is applied to a structure on which the support substrate 211, the lower adhesive layer 214, the base plate 215, the upper adhesive layer 212, the adhesive agent layer 213, and the plastic plate 221 are stacked sequentially. A roller or laminating machine may be used to press the structure, but the present invention is not restricted thereto.

When the plastic plate 221 is pressurized, a space between the plastic plate 221 and the adhesive layer 212 is eliminated and a portion of the plastic plate 221 that extends beyond edges of the adhesive agent layer 213 is attached to the adhesive layer 212. As a result, as shown in FIG. 4G, the plastic plate 221 is attached onto a jig 210' for delivering a liquid crystal display plate. The jig 210' includes the support substrate 211, the lower adhesive layer 214, the base plate 215, the upper adhesive agent layer 212, and the adhesive agent layer 213.

As described above, when the plastic plate 221 is disposed at the jig 210' such that the plastic plate 221 is directly attached to the upper adhesive layer 212, the plastic plate 221 remains fixed during a heating or cooling process. The plastic plate 221 remains fixed since the adhesive strength of the upper adhesive layer 212 is not affected by the heating or cooling process, even if gas is generated from a solvent contained in the adhesive agent layer 213. As a result, product yield increases.

Figure 4H:
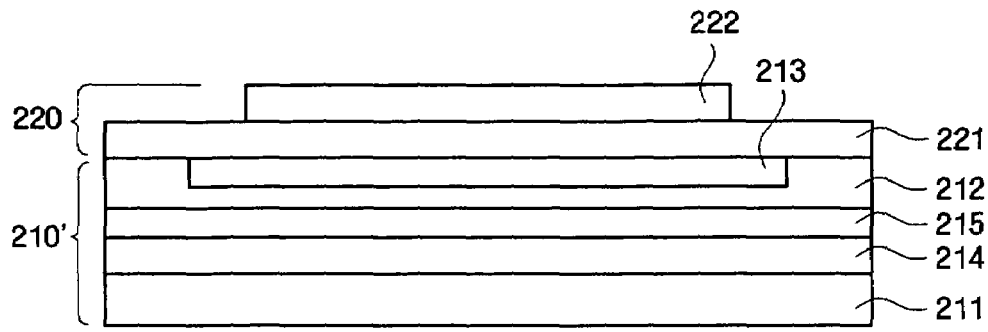
Figure 4I:
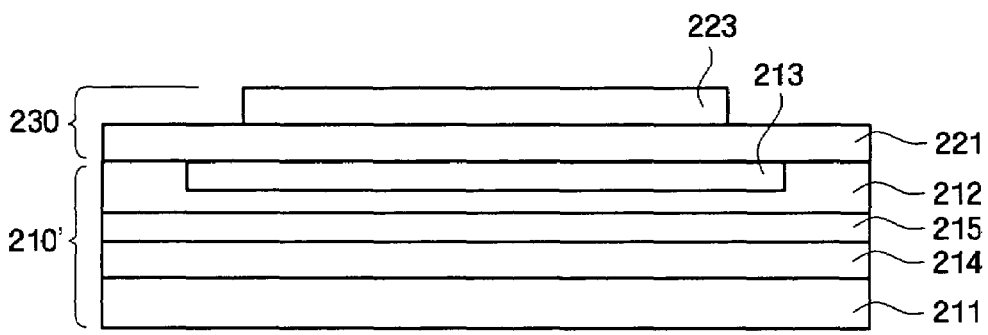

Referring now to FIGS. 3, 4H and 4I, in operation S207, a TFT device layer 222 or an RGB color filter layer 223 is disposed at the plastic plate 221. The jig 210' to which the plastic plate 221 is attached is loaded into a chamber. Although not clearly shown, a gate bus line and a TFT gate electrode are sequentially disposed at the plastic plate 221, and a gate insulating film is formed. Subsequently, a source electrode, a drain electrode and a data bus line are formed, thereby forming a TFT. Next, an indium tin oxide (ITO) pixel electrode is deposited and an over coating layer is formed, thereby forming the TFT device layer 222. The TFT device layer 222 and the plastic plate 221 constitute an array substrate 220 as shown in FIG. 4H.

While the TFT device layer 222 is formed, temperature in the chamber goes up to a range of about 130° C. to about 150° C. However, heat applied to the plastic plate 221 is dispersed by the support substrate 211 included in the jig 210'. In addition, since the plastic plate 221 is firmly fixed to the support substrate 211 by an adhesive agent, the plastic plate 221 is prevented from deforming during fabrication processes.

Referring to FIG. 4I, a color filter substrate 230 including the plastic plate 221 and the RGB color filter layer 223 may be formed through a same process as that used to form the array substrate 220 as described referring to FIG. 4H.

Figure 4J:
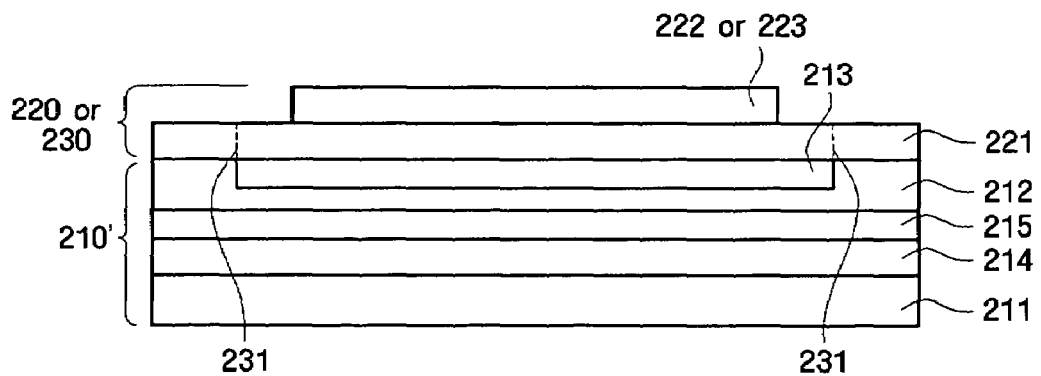
Figure 4K:
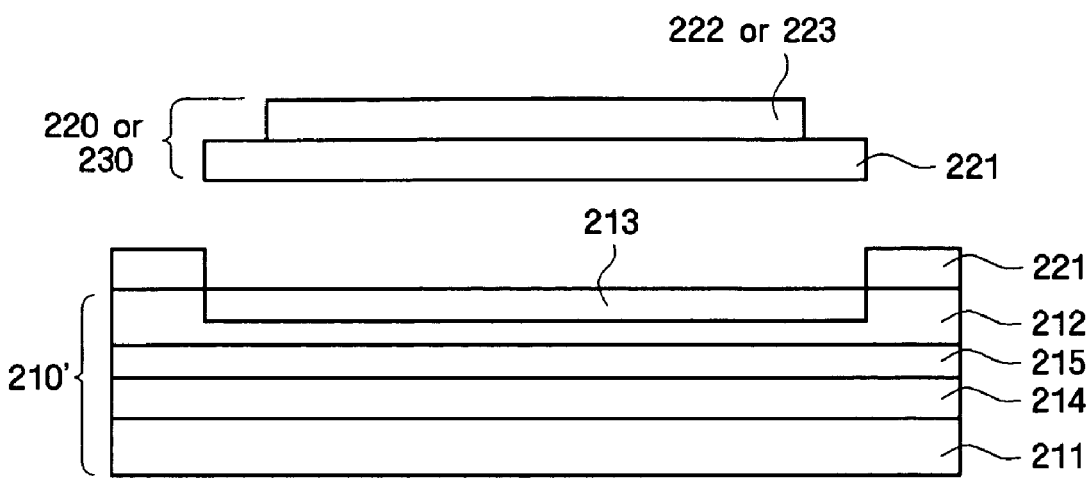

Referring now to FIGS. 3, 4J and 4K, in operation S208, the array substrate 220 or the color filter substrate 230 is separated from the upper adhesive layer 212 and the adhesive agent layer 213. A method of separating the array substrate 220 or the color filter substrate 230 from the upper adhesive layer 212 and the adhesive agent layer 213 will be described below.

Referring to FIG. 4J, a half cutting operation is performed on the array substrate 220 or the color filter substrate 230 to form a separation line 231 to a surface of the adhesive agent layer 213 in the jig 210'. The separation line 231 extends through the plastic plate 221 in a direction substantially perpendicular to a face of the plastic plate 221. Additionally, the separation line 231 may be formed to correspond to edge portions of the adhesive agent layer 213. Through the half cutting operation, the array substrate 220 or the color filter substrate 230 can be easily separated from the jig 210'.

Referring to FIG. 4K, conditions required for separation of the array substrate 220 or the color filter substrate 230 from the jig 210' differ according to a type of adhesive agent forming the adhesive agent layer 213. For example, the adhesive agent forming the adhesive agent layer 213 may release an object when the adhesive agent layer 213 is heated or exposed to ultraviolet (UV) radiation. The adhesive agent forming the adhesive agent layer 213 used to fabricate the liquid crystal display according to this embodiment releases an object at a temperature of about 0° C. to about 5° C. Accordingly, the array substrate 220 or the color filter substrate 230 may be separated from the adhesive agent layer 213 of the jig 210' following about 10 minutes at about 0° C. and about 24 hours at about 5° C.

Figure 4L:
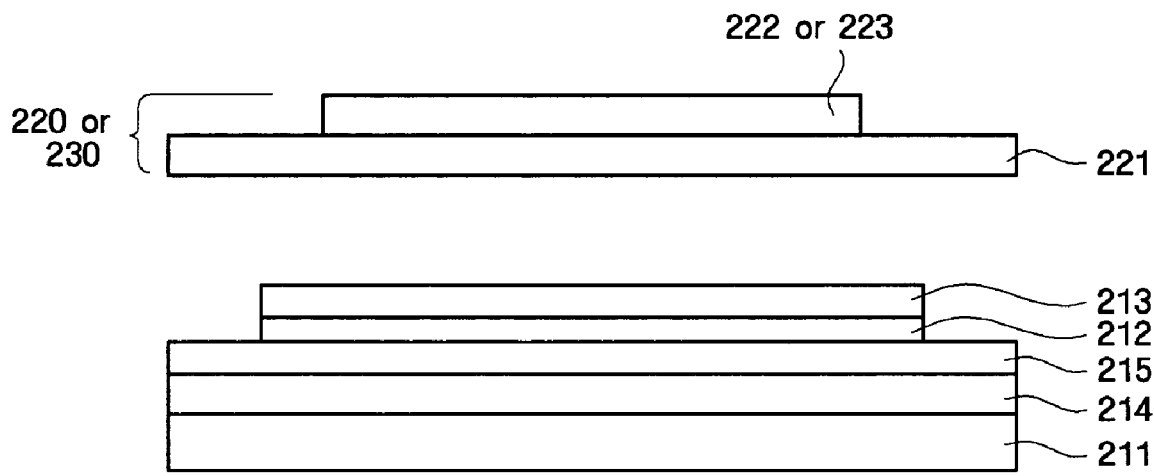

Another method of separating the array substrate 220 or the color filter substrate 230 from the upper adhesive layer 212 and the adhesive agent layer 213 is illustrated in FIG. 4L. A portion of the upper adhesive layer 212 not disposed between the adhesive layer 213 and the base plate 215 is dissolved using an organic solvent such as tetrahydrofuran or chloroform, and then the adhesive agent layer 213 is cooled down to a temperature of about 0° C. to about 5° C. Separating the array substrate 220 or the color filter substrate 230 from the jig 210' may be performed after attaching the array substrate 220 to the color filter substrate 230.

In operation S209, the array substrate 220 and the color filter substrate 230 are attached to each other such that a liquid crystal layer is interposed therebetween.

Referring to FIG. 2K, spacers are sprinkled on the color filter substrate 230 and a seal line 241 is disposed at the array substrate 220. Thereafter, the array substrate 220 and the color filter substrate 230 are attached, and then a liquid crystal 242 is injected into an attached structure, thereby completing a panel. Alternatively, the liquid crystal 242 may be injected into the color filter substrate 230 having spacers sprinkled thereon, and then the array substrate 220 having the seal line 241 may be attached to the color filter substrate 230, thereby completing the panel.

Figure 5:
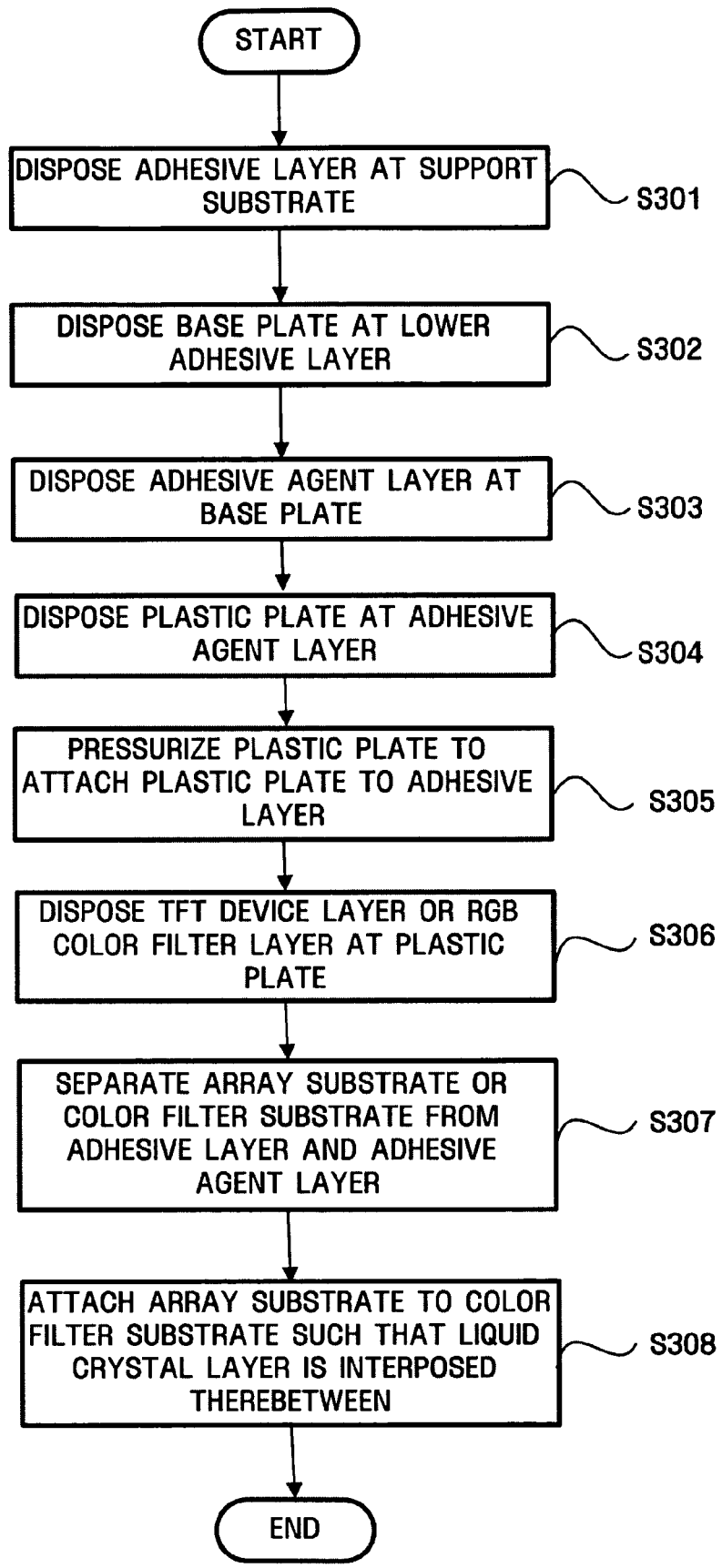
FIG. 5 is a flowchart of a method of fabricating a liquid crystal display according to an exemplary embodiment of the present invention.

FIG. 5 is a flowchart of a method of fabricating a liquid crystal display according to an exemplary embodiment of the present invention. FIGS. 6A through 6K include sectional views and a plane view of stages in the method of fabricating the liquid crystal display.

Figure 6A:
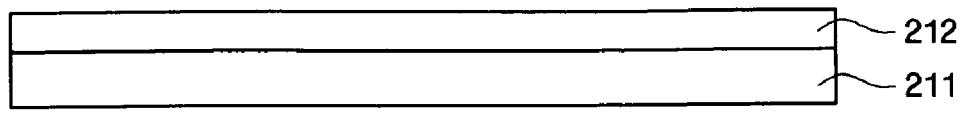
FIGS. 6A through 6K include sectional views and a plane view of stages in the method of fabricating the liquid crystal display of FIG. 5.

Referring to FIGS. 5 and 6A, an adhesive layer 212 is disposed at a support substrate 211. The support substrate 211 may be a glass plate or a transparent resin plate. The adhesive layer 212 has a strong adhesive strength and is formed using a material having adhesive strength which does not decrease due to a heating or cooling process. For example, the adhesive layer 212 may be formed using a silicon adhesion such as a silicon PSA tape or a high heat-resistant silicon adhesion. The adhesive layer 212 is disposed at the support substrate 211 using a typical spin coating or lamination method. The thickness of the adhesive layer 212 may be from about 5 μm to about 15 μm but is not restricted thereto.

Figure 6B:
Figure 6C:
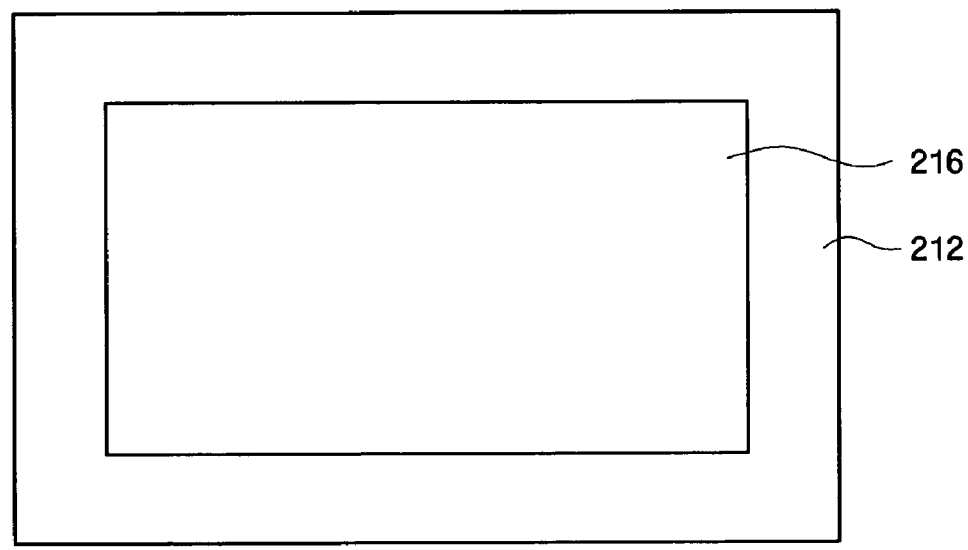

Referring now to FIGS. 1, 6B and 6C, in operation S302, a base plate 216 is disposed at the adhesive layer 212. The base plate 216 is formed to be a smaller size than the adhesive layer 212 to allow a plastic plate to be attached to the adhesive layer 212. The base plate 216 separates the adhesive layer 212 from an adhesive agent layer 213 and thereby prevents components of the adhesive layer 212 from mixing with components of the adhesive agent layer 213. Accordingly, conflicting adhesive properties of the adhesive layer 212 and the adhesive agent layer 213 can be separated, and therefore, excellent adhesiveness and peelability can be obtained.

Figure 6D:
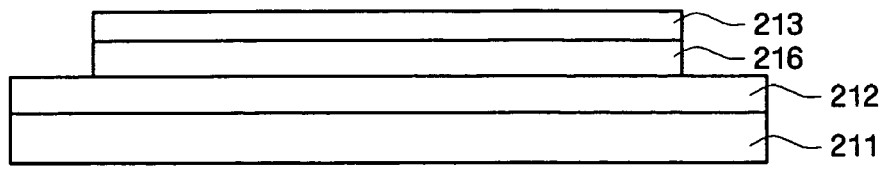

Referring now to FIGS. 5 and 6D, in operation S303, the adhesive agent layer 213 is disposed at the base plate 216. The adhesive agent layer 213 disposed at the base plate 216 fixes an object at room temperature like a typical adhesive agent but is formed using a material that is easily separated from the object by an ultraviolet process, a heating process or cooling process. If an adhesive agent separated from the object by an ultraviolet process is used, the plastic plate may be detached during exposure of an array substrate or color filter substrate and may be broken by a long exposure. If an adhesive agent separated from the object by a heating process is used, stress may be applied to the plastic plate due to thermal expansion during the heating process and crack the plastic plate. Accordingly, the adhesive agent layer 213 used to fabricate the liquid crystal display according to this embodiment of the present invention may be formed using a thermosensitive adhesive agent that is easily separated from the object by a cooling process. For example, the adhesive agent layer 213 may be formed using an acrylic adhesive agent such as an acrylic resin based thermosensitive adhesive tape that is activated at a low temperature. The adhesive agent layer 213 may be disposed at the base plate 216 using a typical spin coating or lamination method. The thickness of the adhesive agent layer 213 may be from about 5 μm to about 15 μm but is not restricted thereto.

Figure 6E:
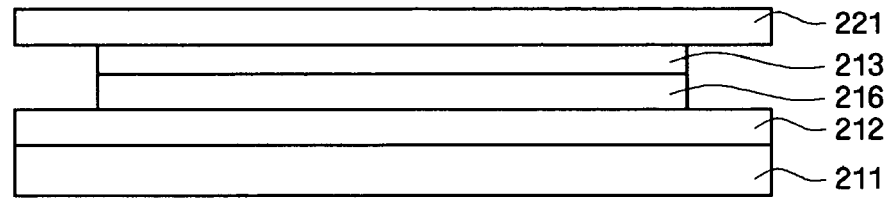

Referring now to FIGS. 5 and 6E, in operation S304, a plastic plate 221 is disposed at the adhesive agent layer 213. The plastic plate 221 may be formed using a polycarbonate plate, a polyether sulfone plate, or a polyarylate plate but is not restricted thereto. The plastic plate 221 has less density than a glass plate having a same thickness as the plastic plate 221, and therefore, a lighter liquid crystal display can be fabricated. Additionally, the plastic plate 221 may have a same resistance to impact as the glass plate, but be thinner than the glass plate, thereby enabling a thinner liquid crystal display to be fabricated. The thickness of the plastic plate 221 may be from about 25 μm to about 400 μm but is not restricted thereto. In addition, the plastic plate 221 should be larger than the adhesive agent layer 213 so that the plastic plate 221 can be attached to the adhesive layer 212 located below the adhesive agent layer 213.

Figure 6F:
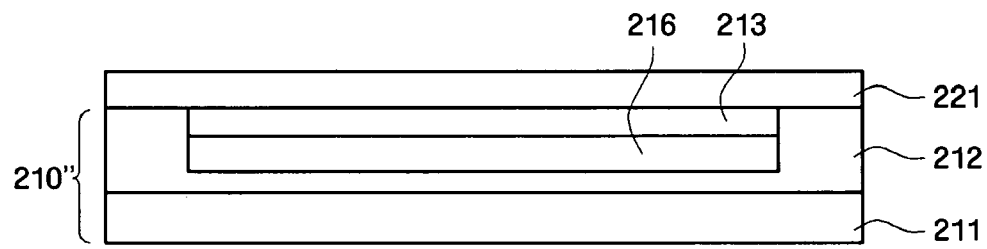

Referring now to FIGS. 5 and 6F, in operation S305, the plastic plate 221 is pressurized to attach the plastic plate 221 to the adhesive layer 212. Pressure is applied to a structure on which the support substrate 211, the adhesive layer 212, the base plate 216, the adhesive agent layer 213, and the plastic plate 221 are stacked sequentially. A roller or laminating machine may be used to press the structure, but the present invention is not restricted thereto.

When the plastic plate 221 is pressurized, a space between the plastic plate 221 and the adhesive layer 212 is eliminated and a portion of the plastic plate 221 that extends beyond edges of the adhesive agent layer 213 is attached to the adhesive layer 212. As a result, as shown in FIG. 6F, the plastic plate 221 is attached onto a jig 210" for delivering a liquid crystal display plate. The jig 210" includes the support substrate 211, the adhesive layer 212, the base plate 216, and the adhesive agent layer 213.

As described above, when the plastic plate 221 is disposed at the jig 210" such that the plastic plate 221 is directly attached to the adhesive layer 212, the plastic plate 221 remains fixed during a heating or cooling process. The plastic plate 221 remains fixed since the adhesive strength of the adhesive layer 212 is not affected by a heating or cooling process, even if gas is generated from a solvent contained in the adhesive agent layer 213. As a result, product yield increases.

Figure 6G:
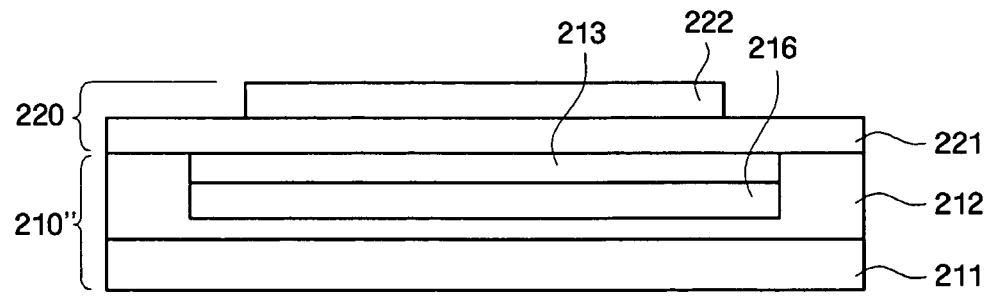
Figure 6H:
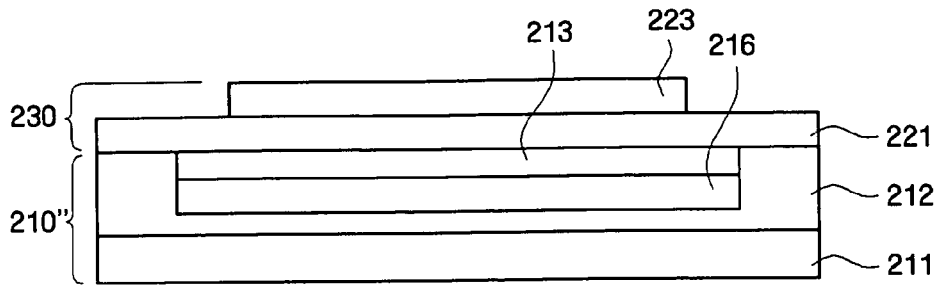

Referring now to FIGS. 5, 6G and 6H, in operation S306, a TFT device layer 222 or an RGB color filter layer 223 is disposed at the plastic plate 221. The jig 210" to which the plastic plate 221 is attached is loaded into a chamber. Although not clearly shown, a gate bus line and a TFT gate electrode are sequentially disposed at the plastic plate 221, and a gate insulating film is formed. Subsequently, a source electrode, a drain electrode and a data bus line are formed, thereby forming a TFT. Next, an indium tin oxide (ITO) pixel electrode is deposited and an over coating layer is formed, thereby forming the TFT device layer 222. The TFT device layer 222 and the plastic plate 221 constitute an array substrate 220 as shown in FIG. 6G.

While the TFT device layer 222 is formed, temperature in the chamber goes up to a range of about 140° C. to about 150° C. However, heat applied to the plastic plate 221 is dispersed by the support substrate 211 included in the jig 210". In addition, since the plastic plate 221 is firmly fixed to the support substrate 211 by an adhesive agent, the plastic plate 221 is prevented from deforming during fabrication processes.

Similarly, as shown in FIG. 6H, a color filter substrate 230 including the plastic plate 221 and the RGB color filter layer 223 may be formed through a same process as that used to form the array substrate 220 as described referring to FIG. 6G.

Figure 6I:
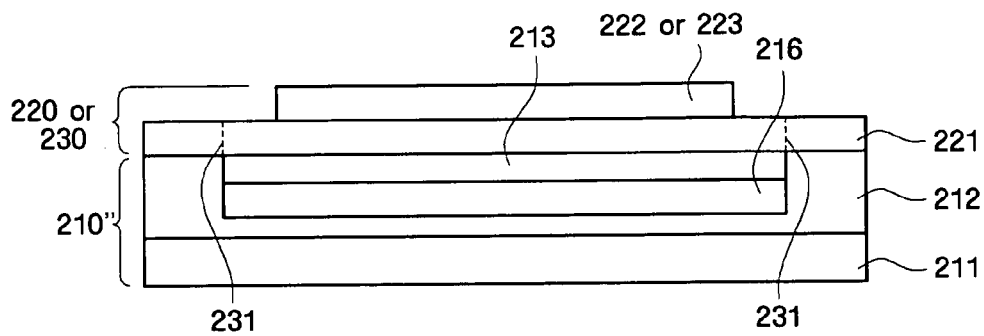
Figure 6J:
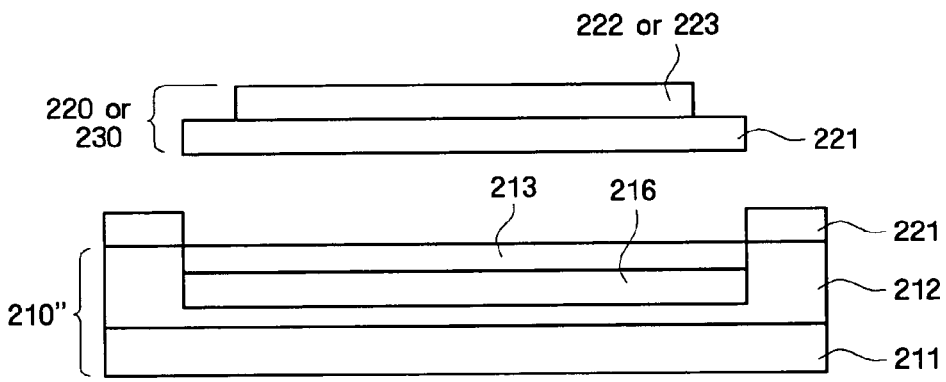

Referring now to FIGS. 5, 6I and 6J, in operation S307, the array substrate 220 or the color filter substrate 230 is separated from the adhesive layer 212 and the adhesive agent layer 213. A method of separating the array substrate 220 or the color filter substrate 230 from the adhesive layer 212 and the adhesive agent layer 213 will be described below.

Referring to FIG. 6I, a half cutting operation is performed on the array substrate 220 or the color filter substrate 230 to form a separation line 231 to a surface of the adhesive agent layer 213 in the jig 210". The separation line 231 extends through the plastic plate 221 in a direction substantially perpendicular to a face of the plastic plate 221. Additionally, the separation line 231 may be formed to correspond to edge portions of the adhesive agent layer 213. Through the half cutting operation, the array substrate 220 or the color filter substrate 230 can be easily separated from the jig 210".

Referring to FIG. 6J, conditions required for separation of the array substrate 220 or the color filter substrate 230 from the jig 210" differ according to a type of adhesive agent forming the adhesive agent layer 213. For example, the adhesive agent forming the adhesive agent layer 213 may release an object when the adhesive agent layer 213 is heated or exposed to ultraviolet (UV) radiation. The adhesive agent forming the adhesive agent layer 213 used to fabricate the liquid crystal display according to this embodiment releases an object at a temperature of about 0° C. to about 5° C. Accordingly, the array substrate 220 or the color filter substrate 230 may be separated from the adhesive agent layer 213 of the jig 210" following about 10 minutes at 0° C. and about 24 hours at 5° C.

Figure 6K:
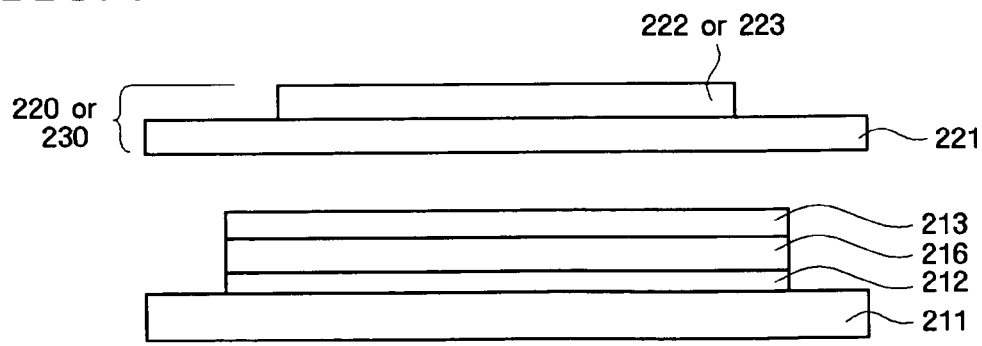

Another method of separating the array substrate 220 or the color filter substrate 230 from the adhesive layer 212 and the adhesive agent layer 213 is illustrated in FIG. 6K. A portion of the adhesive layer 212 not disposed between the base plate 216 and the support substrate 211 is dissolved using an organic solvent such as tetrahydrofuran or chloroform, and then the adhesive agent layer 213 is cooled down to a temperature of about 0° C. to about 5° C. Separating the array substrate 220 or the color filter substrate 230 from the jig 210″ may be performed after attaching the array substrate 220 to the color filter substrate 230.

In operation S308, the array substrate 220 and the color filter substrate 230 are attached to each other such that a liquid crystal layer is interposed therebetween.

Referring back to FIG. 2K, spacers are sprinkled on the color filter substrate 230 and a seal line 241 is disposed at the array substrate 220. Thereafter, the array substrate 220 and the color filter substrate 230 are attached, and then a liquid crystal 242 is injected into an attached structure, thereby completing a panel. Alternatively, the liquid crystal 242 may be injected into the color filter substrate 230 having spacers sprinkled thereon, and then the array substrate 220 having the seal line 241 may be attached to the color filter substrate 230, thereby completing the panel.

Figure 7:
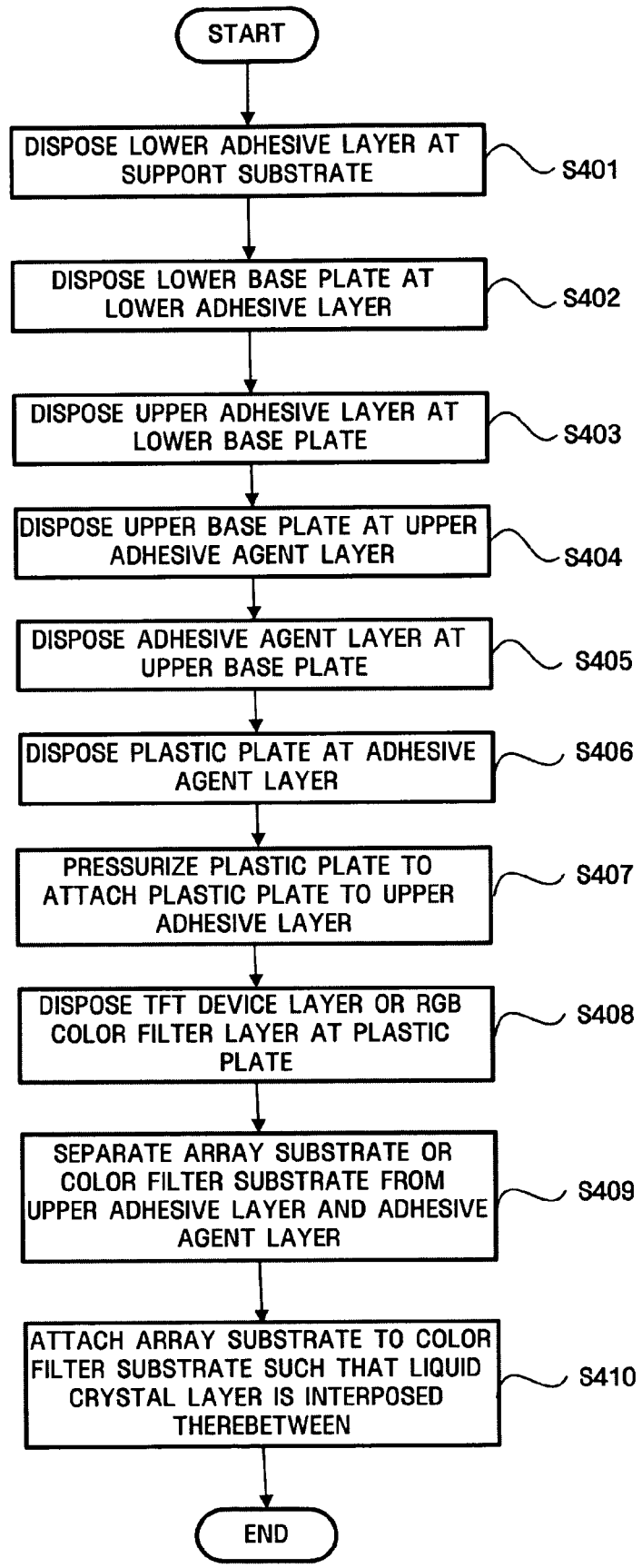
FIG. 7 is a flowchart of a method of fabricating a liquid crystal display according to an exemplary embodiment of the present invention.

FIG. 7 is a flowchart of a method of fabricating a liquid crystal display according to an exemplary embodiment of the present invention. FIGS. 8A through 8M include sectional views and a plane view of stages in the method of fabricating the liquid display.

Figure 8A:
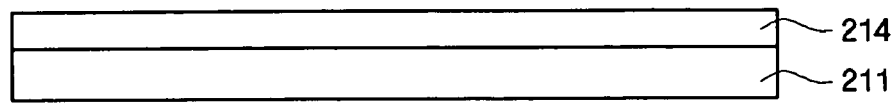
FIGS. 8A through 8M include sectional views and a plane view of stages in the method of fabricating the liquid crystal display of FIG. 7.

Referring to FIGS. 7 and 8A, in operation S401, a lower adhesive layer 214 is disposed at a support substrate 211. The support substrate 211 may be a glass plate or a transparent resin plate. The lower adhesive layer 214 has a strong adhesive strength and is formed using a material having adhesive strength which does not decrease due to a heating or cooling process. For example, the lower adhesive layer 214 may be formed using a silicon adhesion such as a silicon PSA tape or a high heat-resistant silicon adhesion. The lower adhesive layer 214 is disposed at the support substrate 211 using a typical spin coating or lamination method. The thickness of the lower adhesive layer 214 may be from about 5 µm to about 15 µm but is not restricted thereto.

Figure 8B:
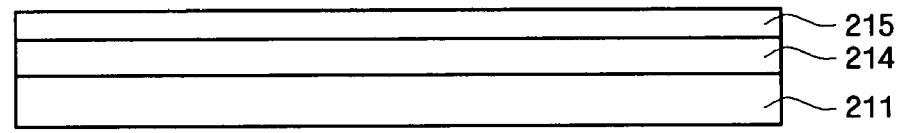

Referring now to FIGS. 7 and 8B, in operation S402, a lower base plate 215 is disposed at the lower adhesive layer 214. The lower base plate 215 may be formed using a polycarbonate plate, a polyether sulfone plate, or a polyarylate plate but is not restricted thereto. The lower base plate 215 supports a plastic plate during an array process in which a TFT device layer is disposed at the plastic plate. In addition, the lower base plate 215 functions as a protective substrate preventing a temperature of the plastic plate from increasing by dispersing heat generated during the array process. The lower base plate 215 may have a thickness of about 10 µm to about 100 µm but is not restricted thereto.

In operation S403, an upper adhesive layer 212 is disposed at the lower base plate 215.

Figure 8C:
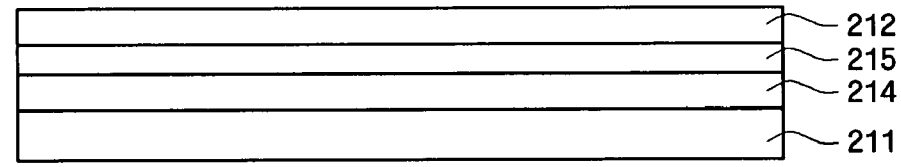

Referring to FIG. 8C, the upper adhesive layer 212 has a strong adhesive strength and is formed using a material having adhesive strength which does not decrease due to a heating or cooling process. For example, the upper adhesive layer 212 may be formed using a silicon adhesion such as a silicon PSA tape or a high heat-resistant silicon adhesion. The upper adhesive layer 212 is disposed at the support substrate 211 using a typical spin coating or lamination method. The thickness of the upper adhesive layer 212 may be from about 5 µm to about 15 µm but is not restricted thereto.

In operation S404, an upper base plate 216 is disposed at the upper adhesive layer 212.

Figure 8D:
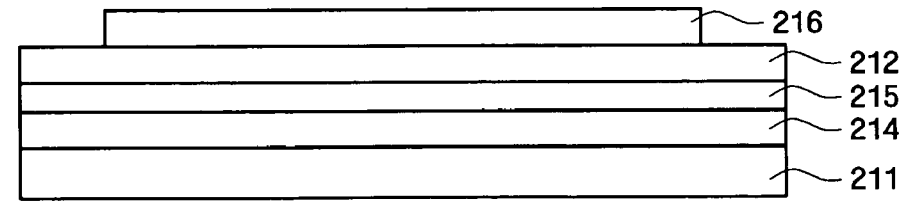
Figure 8E:
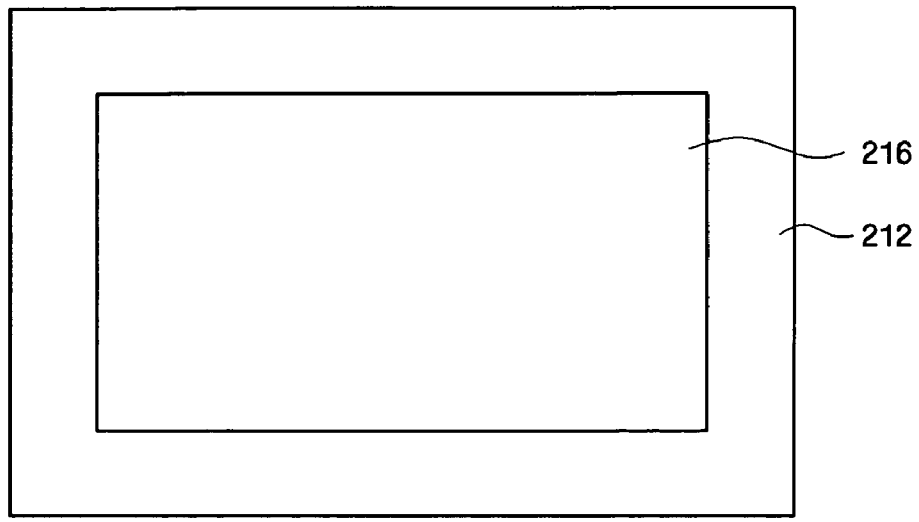

Referring to FIGS. 8D and 8E, the upper base plate 216 is formed in smaller size than the adhesive layer 212 to allow a plastic plate to be attached to the adhesive layer 212.

The upper base plate 216 separates the adhesive layer 212 from an adhesive agent layer 213 (see FIG. 8F) and thereby prevents components of the adhesive layer 212 from mixing with components of the adhesive agent layer 213. Accordingly, conflicting adhesive properties of the adhesive layer 212 and the adhesive agent layer 213 can be separated, and therefore, excellent adhesiveness and peelability can be obtained.

In operation S405, the adhesive agent layer 213 is disposed at the upper base plate 216.

Figure 8F:
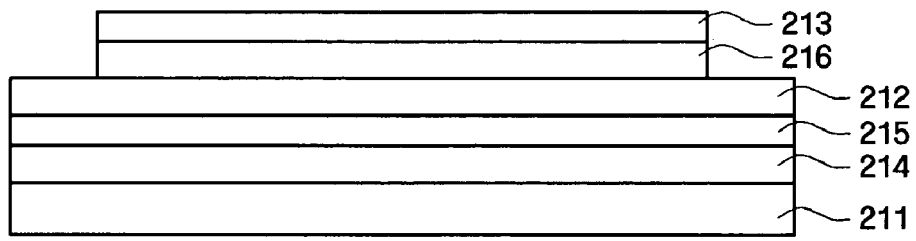

Referring to FIG. 8F, the adhesive agent layer 213 disposed at the upper base plate 216 fixes an object at a room temperature like a typical adhesive agent but is formed using a material that is easily separated from the object by an ultraviolet process, a heating process or cooling process. If an adhesive agent separated from the object by an ultraviolet process is used, the plastic plate may be detached during exposure of an array substrate or color filter substrate and may be broken by a long exposure. If an adhesive agent separated from the object by a heating process is used, stress may be applied to the plastic plate due to thermal expansion during the heating crack the plastic plate. Accordingly, the adhesive agent layer 213 used to fabricate the liquid crystal display according to this embodiment of the present invention may be formed using a thermosensitive adhesive agent that is easily separated from the object by a cooling process. For example, the adhesive agent layer 213 may be formed using an acrylic adhesive agent such as an acrylic resin based thermosensitive adhesive tape that is activated at a low temperature.

The adhesive agent layer 213 may be disposed at the upper base plate 216 using a typical spin coating or lamination method. The thickness of the adhesive agent layer 213 may be from about 5 µm to about 15 µm but is not restricted thereto.

Figure 8G:
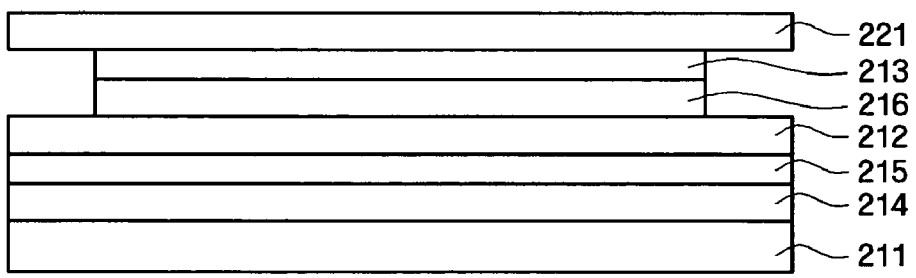

Referring now to FIGS. 7 and 8G, in operation S406, a plastic plate 221 is disposed at the adhesive agent layer 213. The plastic plate 221 may be formed using a polycarbonate plate, a polyether sulfone plate, or a polyarylate plate but is not restricted thereto. The plastic plate 221 has less density than a glass plate having a same thickness as the plastic plate 221, and therefore, a lighter liquid crystal display can be fabricated. Additionally, the plastic plate 221 may have a same resistance to impact as the glass plate, but be thinner than the glass plate, thereby enabling a thinner liquid crystal display to be fabricated. The thickness of the plastic plate 221 may be from about 25 µm to about 400 µm but is not restricted thereto. In addition, the plastic plate 221 should be larger than the adhesive agent layer 213 so that the plastic plate 221 can be attached to the adhesive layer 212 located below the adhesive agent layer 213.

Figure 8H:
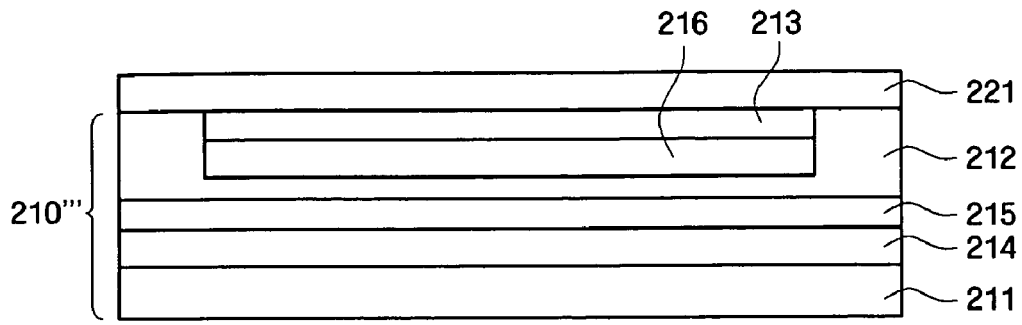

Referring now to FIGS. 7 and 8H, in operation S407, the plastic plate 221 is pressurized to be attached to the upper adhesive layer 212. Pressure is applied to a structure on which the support substrate 211, the lower adhesive layer 214, the lower base plate 215, the upper adhesive layer 212, the upper base plate 216, the adhesive agent layer 213, and the plastic plate 221 are stacked sequentially. A roller or laminating machine may be used to press the structure, but the present invention is not restricted thereto.

When the plastic plate 221 is pressurized, a space between the plastic plate 221 and the upper adhesive layer 212 is eliminated and a portion of the plastic plate 221 that extends beyond edges of the adhesive agent layer 213 is attached to the upper adhesive layer 212. As a result, as shown in FIG. 8H, the plastic plate 221 is attached onto a jig 210‴ for delivering a liquid crystal display plate. The jig 210‴ includes the support substrate 211, the upper adhesive layer 212, the lower adhesive layer 214, the lower base plate 215, the upper base plate 216, and the adhesive agent layer 213.

As described above, when the plastic plate 221 is disposed at the jig 210''' such that the plastic plate 221 is directly attached to the adhesive layer 212, the plastic plate 221 remains fixed during a heating or cooling process. The plastic plate 221 remains fixed since the adhesive strength of the upper adhesive layer 212 is not affected by a heating or cooling process, even if gas is generated from a solvent contained in the adhesive agent layer 213. As a result, product yield increases.

Figure 8I:
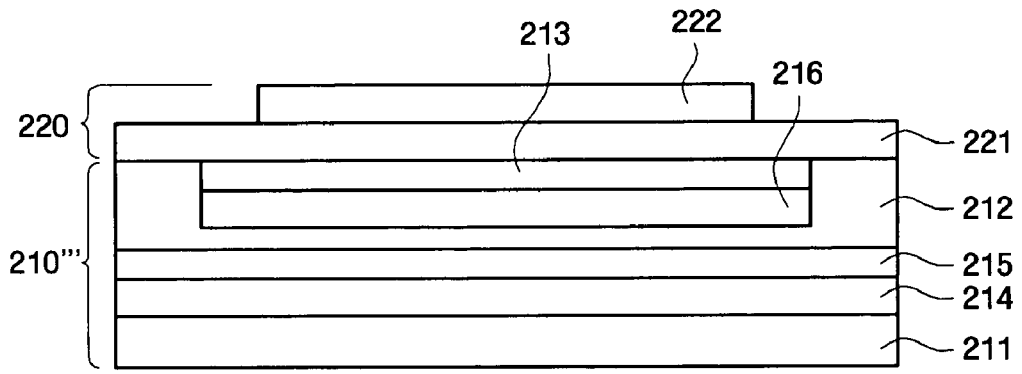
Figure 8J:
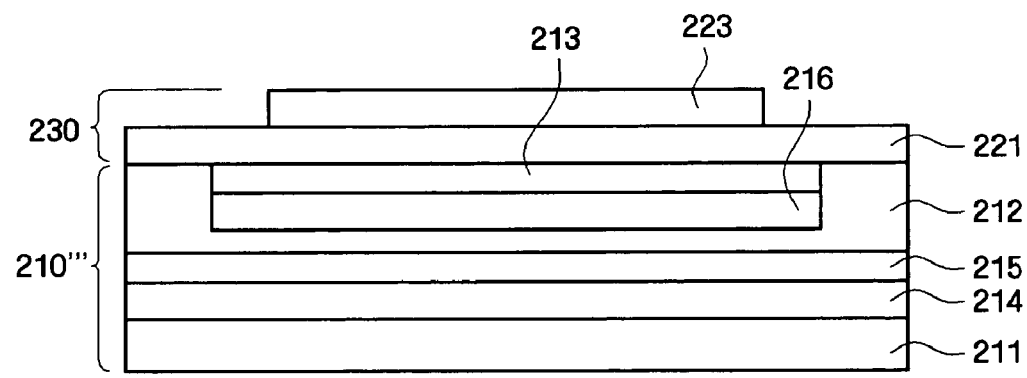

Referring now to FIGS. 7, 8I and 8J, in operation S408, a TFT device layer 222 or an RGB color filter layer 223 is disposed at the plastic plate 221. The jig 210''' to which the plastic plate 221 is attached is loaded into a chamber. Although not clearly shown, a gate bus line and a TFT gate electrode are sequentially disposed at the plastic plate 221, and a gate insulating film is formed. Subsequently, a source electrode, a drain electrode and a data bus line are formed, thereby forming a TFT. Next, an indium tin oxide (ITO) pixel electrode is deposited and an over coating layer is formed, thereby forming the TFT device layer 222. The TFT device layer 222 and the plastic plate 221 constitute an array substrate 220 as shown in FIG. 8I.

While the TFT device layer 222 is formed, temperature in the chamber goes up to a range of about 130° C. to about 150° C. However, heat applied to the plastic plate 221 is dispersed by the support substrate 211 included in the jig 210'''. In addition, since the plastic plate 221 is firmly fixed to the support substrate 211 by an adhesive agent, the plastic plate 221 is prevented from deforming during fabrication processes.

Referring to FIG. 8J, a color filter substrate 230 including the plastic plate 221 and the RGB color filter layer 223 may be formed through a same process as that used to form the array substrate 220 as described referring to FIG. 8I.

Referring now to FIGS. 7, 8K, 8L and 8M, in operation S409, the array substrate 220 or the color filter substrate 230 is separated from the upper adhesive layer 212 and the adhesive agent layer 213. A method of separating the array substrate 220 or the color filter substrate 230 from the upper adhesive layer 212 and the adhesive agent layer 213 will be described below.

Figure 8K:
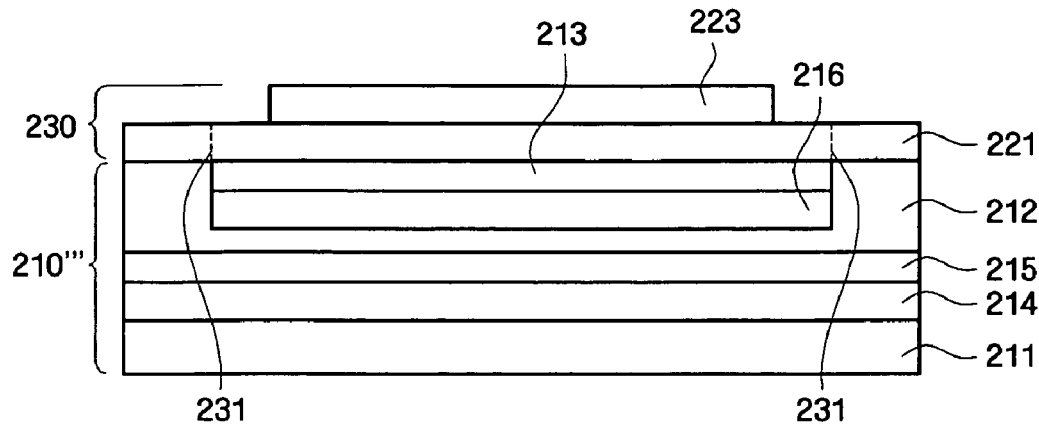

Referring to FIG. 8K, a half cutting operation is performed on the array substrate 220 or the color filter substrate 230 to form a separation line 231 at least to a surface of the adhesive agent layer 213 in the jig 210'''. The separation line 231 extends through the plastic plate 221 in a direction substantially perpendicular to a face of the plastic plate 221. Additionally, the separation line 231 may be formed to correspond to edge portions of the adhesive agent layer 213. Through the half cutting operation, the array substrate 220 or the color filter substrate 230 can be easily separated from the jig 210'''.

Figure 8L:
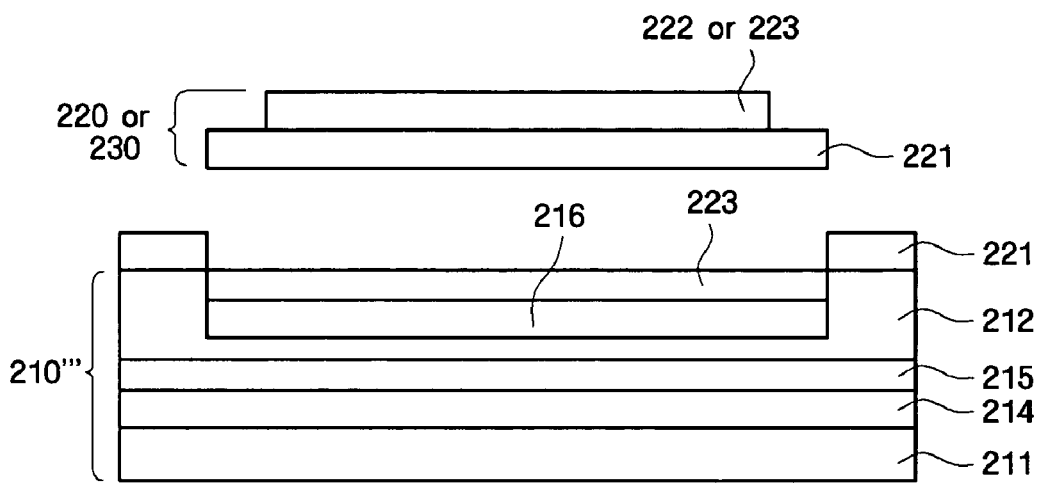

Referring to FIG. 8L, conditions required for separation of the array substrate 220 or the color filter substrate 230 from the jig 210''' differ according to a type of adhesive agent forming the adhesive agent layer 213. For example, the adhesive agent forming the adhesive agent layer 213 may release an object when the adhesive agent layer 213 is heated or exposed to ultraviolet (UV) radiation. The adhesive agent forming the adhesive agent layer 213 used to fabricate the liquid crystal display according to this embodiment releases the object at a temperature of about 0° C. to about 5° C. Accordingly, the array substrate 220 or the color filter substrate 230 may be separated from the adhesive agent layer 213 of the jig 210''' following about 10 minutes at 0° C. and about 24 hours at 5° C.

Figure 8M:
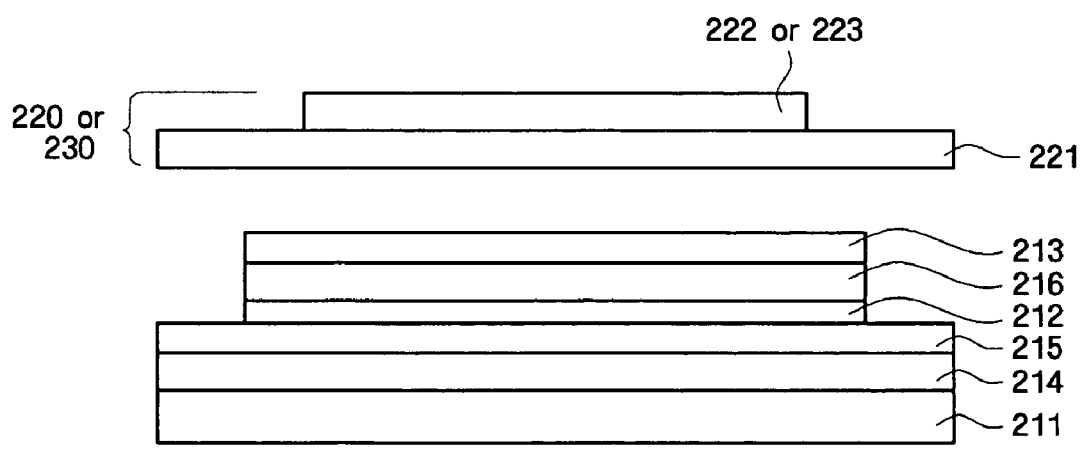

Another method of separating the array substrate 220 or the color filter substrate 230 from the upper adhesive layer 212 and the adhesive agent layer 213 is illustrated in FIG. 8M. A portion of the upper adhesive layer 212 not disposed between the upper base plate 216 and the lower base plate 215 is dissolved using an organic solvent such as tetrahydrofuran or chloroform, and then the adhesive agent layer 213 is cooled down to a temperature of about 0° C. to about 5° C. Separating the array substrate 220 or the color filter substrate 230 from the jig 210''' may be performed after attaching the array substrate 220 to the color filter substrate 230.

In operation S410, the array substrate 220 and the color filter substrate 230 are attached to each other such that a liquid crystal layer is interposed therebetween.

Referring back to FIG. 2K, spacers are sprinkled on the color filter substrate 230 and a seal line 241 is disposed at the array substrate 220. Thereafter, the array substrate 220 and the color filter substrate 230 are attached, and then a liquid crystal 242 is injected into a attached structure, thereby completing a panel. Alternatively, the liquid crystal 242 may be injected into the color filter substrate 230 having spacers sprinkled thereon, and then the array substrate 220 having the seal line 241 may be attached to the color filter substrate 230, thereby completing the panel.

In concluding the detailed description, those skilled in the art will appreciate that many variations and modifications can be made to the preferred embodiments without substantially departing from the principles of the present invention. Therefore, the disclosed preferred embodiments of the invention are used in a generic and descriptive sense only and not for purposes of limitation.

A jig for delivering a liquid crystal display plate and a method of fabricating a liquid crystal display using the jig, according to the present invention, have at least one of the following effects.

First, the present invention provides high close adherence between a plastic plate and a jig for delivering a liquid crystal display plate, thereby preventing the plastic plate from coming off the jig. As a result, surface flatness of the plastic plate can be ensured, and therefore, yield of fabricating plastic liquid crystal displays can be increased.

Second, when the present invention is used, plastic liquid crystal displays can be fabricated using conventional equipment for fabricating glass liquid crystal displays. Accordingly, plastic liquid crystal displays can be fabricated without additional investment for new equipment.

What is claimed is:

1. A jig for delivering a liquid crystal display plate, comprising:
   a support substrate;
   an adhesive layer disposed at the support substrate; and
   an adhesive agent layer disposed on the adhesive layer,
   wherein edge portions of the adhesive agent layer are surrounded by the adhesive layer.

2. The jig of claim 1, wherein the adhesive layer is formed of a silicon adhesive.

3. The jig of claim 1, wherein the adhesive agent layer is a thermosensitive adhesive agent activated at a temperature equal to or lower than approximately 5° C.

4. The jig of claim 1, further comprising a base plate disposed between the support substrate and the adhesive layer.

5. The jig of claim 1, further comprising a base plate disposed between the adhesive layer and the adhesive agent layer, the base plate having substantially a same size as the adhesive agent layer.

6. The jig of claim 1, further comprising:
   a lower base plate adhered to the support substrate and positioned below the adhesive layer; and an upper base plate disposed at the adhesive layer and having substantially a same size as the adhesive agent layer.

7. A method of fabricating a liquid crystal display, comprising:
   disposing an adhesive layer at a support substrate;
   disposing an adhesive agent layer at the adhesive layer;
   disposing a plastic plate at the adhesive agent layer; and
   attaching the plastic plate to a peripheral portion of the adhesive layer surrounding the adhesive agent layer by pressurizing the plastic plate.

8. The method of claim 7, wherein the disposing the adhesive agent layer at the adhesive layer comprises:
   forming the adhesive agent layer such that a size of the adhesive agent layer is smaller than a size of the adhesive layer; and
   disposing the adhesive agent layer such that edge portions of the adhesive agent layer are spaced apart from corresponding edge portions of the adhesive layer.

9. The method of claim 7, wherein the disposing the adhesive layer comprises disposing a silicon adhesive at the support substrate.

10. The method of claim 7, wherein the disposing the adhesive agent layer comprises disposing a thermosensitive adhesive agent that is activated at a temperature equal to or lower than approximately 5° C.

11. The method of claim 7, further comprising:
    performing liquid crystal display fabrication processes on the plastic plate after the attaching the plastic plate; and
    separating the plastic plate from the adhesive layer and the adhesive agent layer after the performing the liquid crystal display fabrication processes.

12. The method of claim 11, wherein the separating of the plastic plate from the adhesive layer and the adhesive agent layer comprises:
    forming a separation line at a surface of the plastic plate and the adhesive agent layer; and
    separating the plastic plate from the adhesive layer and the adhesive agent layer along the separation line.

13. The method of claim 12, further comprising one of:
    applying heat to the adhesive agent layer;
    applying cooling the adhesive agent layer; and
    applying ultraviolet rays to the adhesive agent layer, wherein the applying is performed before the separating the plastic plate from the adhesive layer and the adhesive agent layer along the separation line.

14. The method of claim 12, further comprising cooling the adhesive agent layer to a temperature of about 0° C. to about 5° C., wherein the cooling the adhesive agent layer is performed before the separating the plastic plate from the adhesive layer and the adhesive agent layer along the separation line.

15. The method of claim 12, further comprising maintaining the adhesive agent layer at about 0° C. for about 10 minutes and maintaining the adhesive agent layer at about 5° C. for about 24 hours.

16. The method of claim 11, wherein the separating of the plastic plate from the adhesive layer and the adhesive agent layer comprises:
    dissolving a portion of the adhesive layer using an organic solvent; and
    separating the plastic plate from the adhesive agent layer.

17. The method of claim 16, further comprising applying one of:
    heating the adhesive agent layer;
    cooling the adhesive agent layer; and
    ultraviolet rays to the adhesive agent layer, wherein the applying is performed before the separating the plastic plate from the adhesive agent layer.

18. The method of claim 16, further comprising cooling the adhesive agent layer to a temperature of about 0° C. to about 5 C., wherein the cooling the adhesive agent layer is performed before the separating the plastic plate from the adhesive agent layer.

19. The method of claim 18, further comprising maintaining the adhesive agent layer at about 0° C. for about 10 minutes and maintaining the adhesive agent layer at about 5° C. for about 24 hours.

20. The method of claim 16, wherein the organic solvent is tetrahydrofuran or chloroform.

21. The method of claim 7, further comprising disposing a base plate between the adhesive layer and the support substrate.

22. The method of claim 7, further comprising:
    disposing a lower base plate between the adhesive layer and the support substrate; and
    disposing an upper base plate at the adhesive layer, the upper base substrate having substantially a same size as the adhesive agent layer.

* * * * *